US012364348B2

(12) United States Patent
Spiro et al.

(10) Patent No.: US 12,364,348 B2
(45) Date of Patent: Jul. 22, 2025

(54) SYSTEM FOR RETAINING A SUBSTRATE WITHIN A FRAME

(71) Applicant: Tracer Imaging LLC, Ossining, NY (US)

(72) Inventors: Steven M. Spiro, Chappaqua, NY (US); Ryan Kelly, Scarsdale, NY (US); Paul Dowd, Ossining, NY (US)

(73) Assignee: Tracer Imaging LLC, Ossining, NY (US)

( * ) Notice: Subject to any disclaimer, the term of this patent is extended or adjusted under 35 U.S.C. 154(b) by 297 days.

(21) Appl. No.: 18/073,902

(22) Filed: Dec. 2, 2022

(65) Prior Publication Data

US 2023/0165391 A1 Jun. 1, 2023

Related U.S. Application Data

(63) Continuation of application No. 16/902,733, filed on Jun. 16, 2020, now Pat. No. 11,553,808.

(Continued)

(51) Int. Cl.

*A47G 1/06* (2006.01)
*A47G 1/08* (2006.01)

(Continued)

(52) U.S. Cl.

CPC ........... *A47G 1/102* (2019.08); *A47G 1/0605* (2013.01); *A47G 1/08* (2013.01); *A47G 1/142* (2013.01);

(Continued)

(58) Field of Classification Search

CPC .......... G09F 1/12; G09F 15/0012; G09F 1/10; A47G 1/06

See application file for complete search history.

(56) References Cited

U.S. PATENT DOCUMENTS 1,463,150 A 7/1923 Carisen
2,155,729 A 4/1939 Mainieri (Continued)

FOREIGN PATENT DOCUMENTS

DE 199 00 831 5/2000
EP 1149550 10/2001

(Continued)

OTHER PUBLICATIONS

Notice of Reasons for Refusal in JP Application No. 2021-574180, mailed Nov. 27, 2023, an English Translation attached hereto. (17 pages).

(Continued)

*Primary Examiner* — Shin H Kim
(74) *Attorney, Agent, or Firm* — Leason Ellis LLP

(57) ABSTRACT

A frame assembly includes a frame base and a rear panel including a plurality of side walls that are configured to be received within a plurality of side walls of the frame base. Along an external surface of each side wall of the rear panel there is at least one locking tab that is configured for reception within one corresponding locking opening of the frame base when the rear panel is inserted into the frame base so as couple the rear panel to the frame base in a snap-fitting manner and permit a canvas substrate to be captured therebetween for holding the canvas substrate across a front face of the frame base.

11 Claims, 23 Drawing Sheets

Related U.S. Application Data

(60) Provisional application No. 62/863,370, filed on Jun. 19, 2019.

(51) Int. Cl.

| | |
|---|---|
| ***A47G 1/10*** | (2006.01) |
| ***A47G 1/14*** | (2006.01) |
| ***B44D 3/18*** | (2006.01) |
| ***G09F 1/12*** | (2006.01) |
| ***G09F 7/18*** | (2006.01) |

(52) U.S. Cl.

CPC ............... *B44D 3/185* (2013.01); *G09F 7/18* (2013.01); *A47G 2001/0661* (2013.01); *A47G 2001/0677* (2013.01); *A47G 2001/0694* (2013.01); *G09F 2007/1843* (2013.01)

(56) References Cited

U.S. PATENT DOCUMENTS

| | | | | |
|---|---|---|---|---|
| 2,470,416 | A | 5/1949 | Stan | |
| 2,567,743 | A | 9/1951 | Stafford et al. | |
| 2,959,882 | A | 11/1960 | Krull | |
| 3,294,429 | A | 12/1966 | Halp | |
| 3,429,602 | A | 2/1969 | Dirilgen | |
| 3,529,653 | A | 9/1970 | Fey | |
| 3,657,796 | A | 4/1972 | Gochnauer | |
| 3,865,342 | A * | 2/1975 | Kanzelberger | A47G 1/1626 40/757 |
| 4,018,260 | A | 4/1977 | Baslow | |
| 4,041,861 | A | 8/1977 | Alter | |
| 4,144,660 | A | 3/1979 | Lamb | |
| 4,197,686 | A | 4/1980 | Baslow | |
| 4,201,359 | A | 5/1980 | Baslow | |
| 4,286,400 | A | 9/1981 | MacPherson | |
| 4,348,826 | A | 9/1982 | Reim | |
| 4,451,997 | A | 6/1984 | Jones | |
| 4,485,574 | A | 12/1984 | Bennetot | |
| 4,637,147 | A | 1/1987 | Wolsey | |
| 4,762,076 | A | 8/1988 | Wakaizumi | |
| 5,058,353 | A | 10/1991 | Gartner | |
| 5,075,991 | A | 12/1991 | Wenkman et al. | |
| 5,275,224 | A | 1/1994 | Morris | |
| 5,307,575 | A | 5/1994 | Ivansson et al. | |
| 5,466,086 | A | 11/1995 | Goto | |
| 5,502,906 | A | 4/1996 | Yamawaki | |
| 5,579,595 | A | 12/1996 | Dutton | |
| 6,138,741 | A | 10/2000 | Stobart | |
| 6,189,252 | B1 | 2/2001 | Dowzall | |
| 6,253,471 | B1 | 7/2001 | Strauh | |
| 6,347,466 | B1 | 2/2002 | Lackner | |
| 6,615,525 | B1 * | 9/2003 | Chang | A47G 1/06 40/745 |
| 6,722,096 | B2 | 4/2004 | Von Arx | |
| 6,729,057 | B1 | 5/2004 | Lu | |
| 6,992,693 | B2 * | 1/2006 | Tajika | G02B 30/27 345/905 |
| 7,293,378 | B2 | 11/2007 | Bihr | |
| 7,735,541 | B2 | 6/2010 | Ocampo | |
| 8,793,910 | B2 | 8/2014 | Froio | |
| 8,936,065 | B1 | 1/2015 | Gillespie | |
| 9,402,488 | B2 | 8/2016 | Morrish | |
| 11,523,693 | B2 * | 12/2022 | Spiro | A47G 1/14 |
| 11,553,808 | B2 * | 1/2023 | Spiro | G09F 15/0018 |
| 11,857,091 | B2 * | 1/2024 | Spiro | A47G 1/10 |
| 2001/0014250 | A1 | 8/2001 | Plummer et al. | |
| 2003/0136073 | A1 | 7/2003 | Arx et al. | |
| 2003/0200712 | A1 | 10/2003 | Brownsell et al. | |
| 2004/0226208 | A1 | 11/2004 | Kownacki et al. | |
| 2005/0129460 | A1 | 6/2005 | Medcalf | |
| 2007/0234620 | A1 * | 10/2007 | Vineyard | A47G 1/142 40/762 |
| 2007/0245650 | A1 | 10/2007 | Brown | |
| 2009/0031593 | A1 | 2/2009 | Kasuya | |
| 2010/0147471 | A1 | 6/2010 | Bull | |
| 2012/0090211 | A1 | 4/2012 | Price | |
| 2013/0067785 | A1 | 3/2013 | Davis | |
| 2013/0180142 | A1 | 7/2013 | Kressin | |
| 2013/0333851 | A1 | 12/2013 | Chen | |
| 2014/0352184 | A1 | 12/2014 | Hall | |
| 2015/0297001 | A1 | 10/2015 | Welch | |
| 2016/0296033 | A1 | 10/2016 | Feltrin | |
| 2017/0151772 | A1 | 6/2017 | Spiro et al. | |
| 2018/0199736 | A1 | 7/2018 | Spiro et al. | |
| 2023/0383901 | A1 * | 11/2023 | Hoffman | F16M 13/02 |

FOREIGN PATENT DOCUMENTS

| | | | |
|---|---|---|---|
| FR | 2 609 615 | 7/1988 | |
| GB | 1 334 851 | 10/1973 | |
| JP | 40-6073 | 2/1965 | |
| JP | 49-19648 | 2/1974 | |
| JP | 50-19535 | 3/1975 | |
| JP | S62-271800 | 11/1987 | |
| JP | S63 197585 | 12/1988 | |
| JP | H03501699 | 4/1991 | |
| JP | 09-263100 | 10/1997 | |
| JP | 2003306000 | 10/2003 | |
| JP | 2006001282 | 1/2006 | |
| JP | 2008-194194 | 8/2008 | |
| JP | 2009153680 | 7/2009 | |
| JP | 2018103582 | 7/2018 | |
| WO | WO-2006102455 A2 * | 9/2006 | A47G 1/06 |
| WO | WO 2007/123394 | 11/2007 | |
| WO | WO 2012/076370 | 6/2012 | |
| WO | 2017196480 | 11/2017 | |

OTHER PUBLICATIONS

European Search Report in EP Application No. 20827526.3-1201/3986722, mailed Jun. 9, 2023.

"5 x 7 Double Picture Frame for Tabletop, Slide in Rear Backer—Silver" (DISPLAYSZGO) Nov. 17, 2015 (Nov. 17, 2015); retrieved from internet Apr. 6, 2018; <https://web.archive.org/web/20151117081709/https://www.displays2go.com/P-12957/Metal-Picture-Frame-Displays-Two-5-x-7-Prints>; entire document.

* cited by examiner

SYSTEM FOR RETAINING A SUBSTRATE WITHIN A FRAME

CROSS-REFERENCE TO RELATED APPLICATION

This application is a continuation of U.S. application Ser. No. 16/902,733, filed Jun. 16, 2020, which is based on and claims priority to U.S. Provisional Patent Application 62/863,370, filed Jun. 19, 2019, the entire contents of which is incorporated by reference herein as if expressly set forth in its respective entirety herein.

This application is also related to U.S. patent application Ser. No. 15/849,418, filed Dec. 20, 2017, which is incorporated by reference as if expressly set forth in their respective entirety herein.

TECHNICAL FIELD

The present application is directed to the field of frames and more particularly to a frame that is assembled by way of a snap-fit with a substrate, such as a canvas, being captured within and between two parts of the frame that are snap-fit together.

BACKGROUND

There are many ways to display photographs and art with one of the most common techniques being the use of a frame. There are many types of frames but in general, the frames include a rear frame structure that in the case of a photo frame receives the photo and then a front frame structure which in the case of a photo frame is typically a transparent plate, such as a glass plate or acrylic plate.

For displaying art, such as a canvas painting, many different techniques are available including the use of a stretcher frame or a frame and mat arrangement. Recently, canvas prints (a photograph printed on a canvas) have become increasingly popular. Canvas prints are available from a number of retail location including pharmacies, etc. Besides printing the photo on canvas, the printed canvas is then assembled by securing the canvas to the frame. This process can be challenging and require the use of special tools, etc.

There is therefore a need for a simpler frame construction and assembly technique to allow the canvas prints to be assembled more easily and quicker.

SUMMARY

In one embodiment, a frame assembly is provided and includes a frame base and a rear panel. The frame base includes a plurality of side walls with first slits formed between adjacent side walls in corners of the frame base and a rear face of the frame base having an inner channel that is spaced inward from the plurality of side walls. Each of the plurality of side walls has at least one locking opening formed therein. The rear panel includes a plurality of side walls that are configured to be received within the plurality of side walls of the frame base. Second slits are formed between adjacent side walls of the rear panel. Along an external surface of each side wall of the rear panel there is at least one locking tab that is configured for reception within one corresponding locking opening of the frame base when the rear panel is inserted into the frame base so as couple the rear panel to the frame base and permit a canvas substrate to be captured therebetween.

In another aspect, a framed canvas print is provided and includes a canvas substrate, a frame base and a rear panel. The frame base includes a plurality of side walls with first slits formed between adjacent side walls in corners of the frame base and a rear face of the frame base having an inner channel that is spaced inward from the plurality of side walls and, each of the plurality of side walls having at least one locking opening formed therein. The rear panel includes a plurality of side walls that are configured to be received within the plurality of side walls of the frame base. Second slits are formed between adjacent side walls of the rear panel and align with the first slits, wherein along an external surface of each side wall of the rear panel there is at least one locking tab that is configured for reception within one corresponding locking opening of the frame base when the rear panel is inserted into the frame base so as couple the rear panel to the frame base. The canvas substrate is disposed across a front face of the frame base and is folded over the frame base and tucked into the inner channel and is captured between the frame base and the rear panel when the rear panel is coupled to the frame base.

In another aspect, a kit for constructing a canvas print is provided and includes an adapter fixture for use with a first adapter. The adapter fixture includes a fixture base that defines a platform for receiving the first adapter and a plurality of linkages that are disposed about the platform and coupled to the base. Each linkage is configured to move between a first position in which a fence bearing surface thereof is at an angle other than 90 degrees relative to the platform and a second position in which the fence bearing surface is set at an at least substantially 90 degree angle relative to the platform for locking and holding the first adapter in place.

The first adapter includes an adapter base having an open space defined by a floor and a plurality of side walls that extend upwardly from the floor. The adapter base has a plurality of pins that are coupled to and extend upwardly from the floor, wherein the plurality of pins includes a first pin that is located at an outer corner of the adapter base and a second pin that is located diagonally opposite the first pin at an inner corner of the adapter base. The adapter base is disposed on the platform and is locked in place with the plurality of linkages are in the second position.

In another aspect, a method for assembling a canvas print that includes the steps of:

- preparing a canvas substrate that includes a printed side;
- placing the canvas substrate with the printed side facing down;
- disposing a frame base over the canvas substrate;
- folding edges of the canvas substrate over sides of the frame base;
- inserting a rear panel into the frame base; and
- pressing the rear panel downward until a snap-fit connection is realized between the rear panel and the frame base with the folded edges of the canvas substrate being captured between the rear panel and the frame base and being taut across a forward face of the frame base.

BRIEF DESCRIPTION OF THE DRAWING FIGURES

The present invention may be appreciated by reference to the following descriptions and drawings, in which.

DETAILED DESCRIPTION OF CERTAIN EMBODIMENTS

As discussed herein, the present invention is directed to a display unit (framed product, such as a canvas print) which can be in the form of a framed canvas print and equipment that is used to assemble the display unit.

Display Unit (Assembled Framed Canvas Print)

Figure 19:
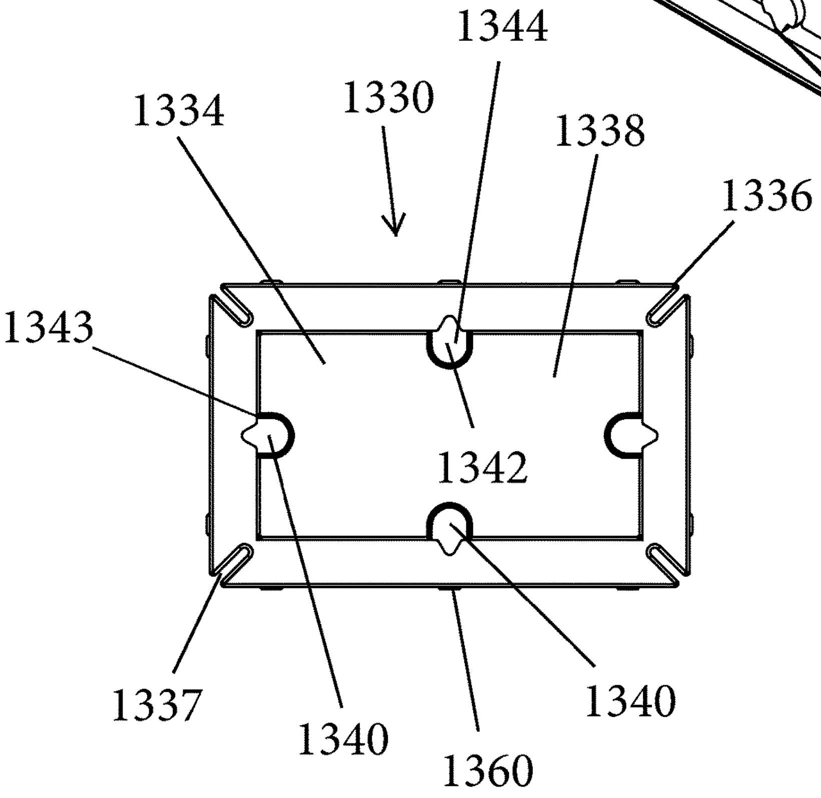
FIG. 19 is a rear elevation view thereof.

In accordance with one embodiment, the present invention is directed to a modular display unit 10 (FIGS. 31 and 32) for displaying an image, such as a printed canvas substrate 11. The display unit 10 can be considered to be an assembled frame product and is formed of two parts that are constructed to interlockingly engage one another to capture and retain the canvas substrate 11 between the two parts with the canvas substrate 11 stretched over the outside of one of the parts. In the illustrated embodiment, one part comprises a frame member, shown at 1320 (FIG. 15), and the other part comprises a rear panel, shown at 1330 (FIG. 19). In the illustrated embodiment, the two parts interlock via a mechanical connection, such as a reversible snap-fit. The canvas substrate 11 is held taut (stretched) over the frame member (frame base) 1320.

Another aspect of the present invention is the equipment that is used to assembly the display unit 10 as described below.

Equipment for Assembling Display Unit

The equipment of the present invention has been configured to be easy to use and is simple in construction; however, the equipment effectuates assembly of the display unit 10 in an effective manner so as to allow complete assembly in a short amount of time.

Figure 6:
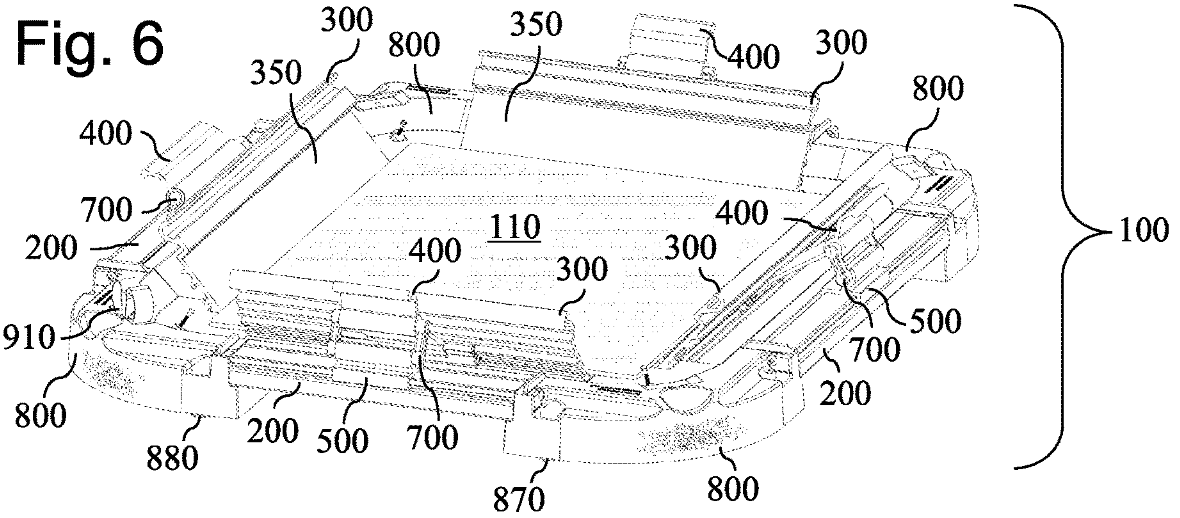
FIG. 6 is a perspective view of the working assembly fixture, fences lowered.
Figure 7:
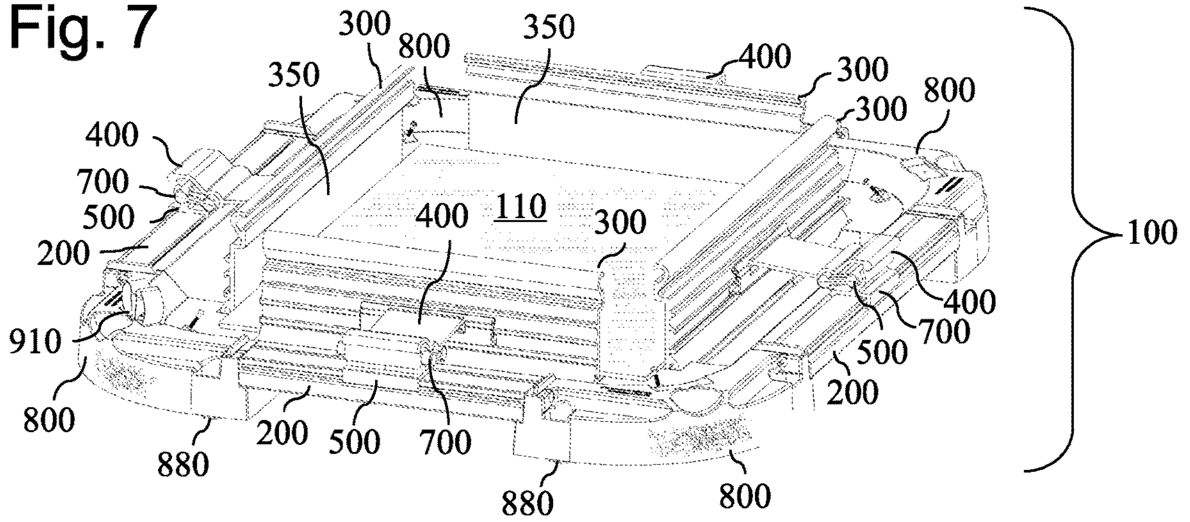
FIG. 7 is a perspective view the working assembly fixture, fences raised.
Figure 8:
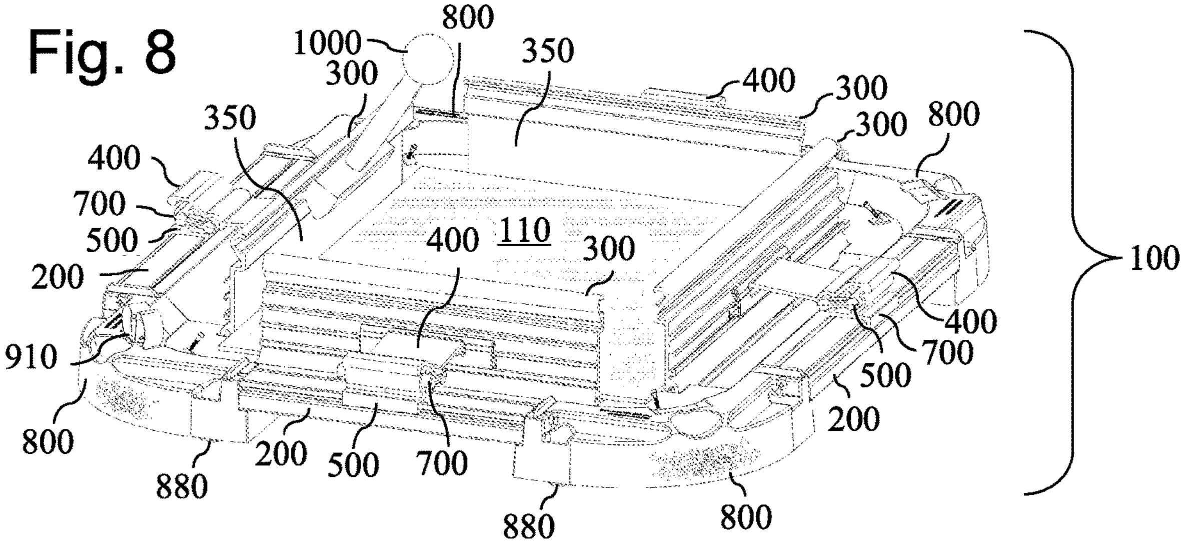
FIG. 8 is a perspective view the working assembly fixture, fences raised, and spline insertion tool engaged to one fence.

Adapter fixture 100, illustrated in FIGS. 6-8 inclusive, is part the equipment that is used during assembly of the various (multiple) sized display units 10 and is therefore part of a modular design. The adapter fixture 100 is the same piece of equipment that is disclosed in the '418 application and labeled as the spline installation fixture for installing splines. The adapter fixture 100 can be used by itself to assemble one size of the display unit, such as an 8×10 frame product; and additionally, the adapter fixture 100 can be used in combination with other components (parts) to allow manufacture of other sized frame products, such as 5×7, 4×6 and 5×5 as described herein. When used by itself, the adapter fixture 100 can hold one part of the display unit, such as the frame member 1320 with the canvas substrate 11 disposed across one face of the frame member 1320 and then the other part of the display unit, such as the rear panel 1330, can be interlockingly (or other type of mechanical connection) mated to the frame member 1320 to hold the canvas substrate 11 in place and in a taut condition.

Adapter fixture 100 is a tabletop assembly aid that includes four fences, each of which can be separately raised into a vertical position. The fixture is used to hold and secure a preassembled frame as splines are inserted into the frame. As this wedging action often requires considerable mechanical force to ensure secure assembly, the fixture also includes engagement features for a tool that imparts substantial force, without the noise, damage, or danger implicit in any impact tool.

Platen 110 provides a flat base onto which a preassembled frame may be located for assembly in accordance with the invention. It may be made of metal, acrylic, styrene, polyvinyl chloride (PVC), polycarbonate, acrylonitrile butadiene styrene (ABS), phenolic, or other polymer or resin.

A tight fit with a full range of frame designs requires that the perimeter of the platen not be occupied by any hinge pin, pintle, or axle at the center of rotation of the displaceable fence. Accordingly, fixtures most suitable for use within the invention employ centerless hinges. The structure of a fence system combining a centerless hinge with a locking linkage is shown in the sectional views illustrated in FIGS. 6-8 inclusive.

Figure 1:
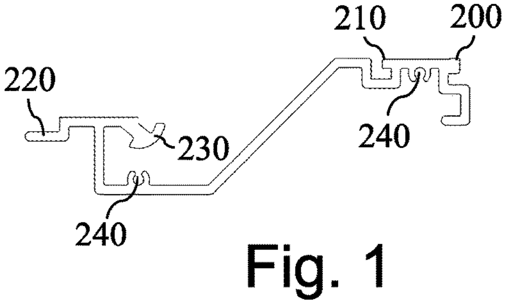
FIG. 1 is a sectional view of the aluminum base extrusion used in the illustrated variation of the assembly fixture.
Figure 2:
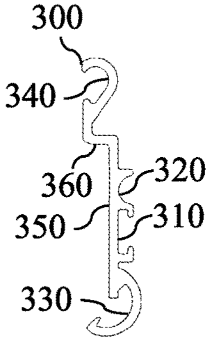
FIG. 2 is a sectional view of aluminum fence extrusion used in illustrated variation of the assembly fixture.

FIG. 1 shows base extrusion 200. FIG. 2 shows fence extrusion 300.

Figure 3:
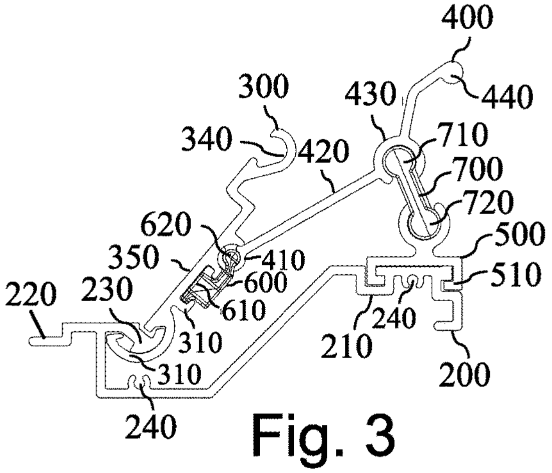
FIG. 3 is a detailed schematic end view of a locking linkage mechanism, in its lowered position.
Figure 4:
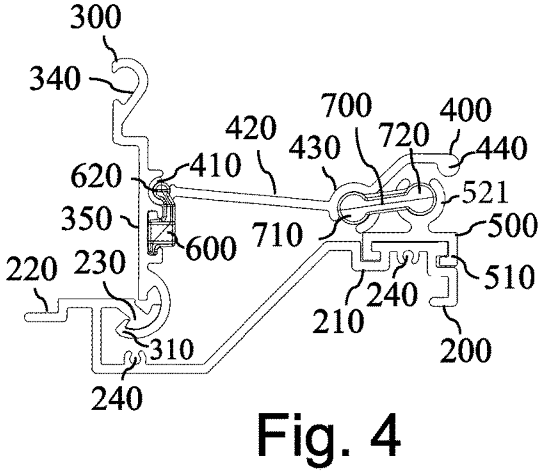
FIG. 4 is a detailed schematic end view of a locking linkage mechanism, in its raised position.

FIG. 3 and FIG. 4 depict those two component, as well as two additional lengths of aluminum extrusion and two injection-molded polymer components, showing the set of parts assembled into a displaceable fence subassembly. FIG. 3 shows that raising the handle of linkage extrusion 400 lowers the fence, while lowering the linkage extrusion raises the fence. Compatible imagery is shown in illustrations of the complete fixture shown in FIGS. 6, 7, and 8.

Returning now to FIG. 1, base extrusion 200 includes base T-slot 210, platen ledge 220, centerless hinge hook 230, and screw channels 240. In FIG. 2, showing fence extrusion 300, features of the extrusion include fence T-slot 310, semicircular socket 320, centerless hinge half-ring 330, tool hook 340, and fence bearing face 350. Fence perpendicular extension 360 geometrically connects tool hook 340 and fence bearing face 350

When base extrusion 200 and fence extrusion 300 are interlinked, as shown in FIG. 3 and FIG. 4, a centerless hinge is formed, and the parts allowed to be displaced into a perpendicular relationship without obstruction of the inner volume. FIG. 3 and FIG. 4 include further components which limit and activate the displaceable fence components.

Linkage extrusion 400 includes linkage fence socket 410, linkage beam 420, linkage tie-bar socket 430, and linkage handle 440. Mounting extrusion 500 includes C-shaped channel 510 and mounting tie-bar socket 521. Molded fence coupling 600 includes fence-coupling T-fitting 610 and coupling linkage axle 620. Molded tie-bar 700 includes tie-bar axles 710 and 720. Base extrusion 200 and fence extrusion 300 are moveably interlinked. Molded fence coupling 600 links fence extrusion moveably to linkage extrusion 400. Linkage extrusion 400 is connected to mounting extrusion via molded tie-bar 700.

As may be appreciated by the drawings, each of the four rotational features in the linkage can move freely, but only over designated angular range. The illustrated configuration provides bi-stable operation, namely, the fence naturally locks in a secure position at each extent of the allowed angular range. This property allows hands-free operation, and prohibits premature displacement of the fences as force is applied to install the splines into the frame.

Referring to FIGS. 6-8, the linear aluminum extrusions are laid upon molded positioning ledge of quarter-round base component 800 and joined to the molded base part using screw channels 240. Screws are fitted through pilot holes and tapped into screw channels 240 formed integrally with base extrusion 200. Screw retention fins deter screws from lifting from their designated slots.

A clip depression is dimensioned to receive tool holder 910. Tool holder 910 is amenably made of plated spring steel, and is fixed in place by the collaborative action of tool holder screw and the conformal contours of clip depression. Base concavity allows room for the knob on insertion tool 1000, shown in detail in FIG. 5. Angled pin mounting is formed in the base such that, at each corner, threaded pin may be located in its associated mounting, and its extension from the mounting feature independently adjusted.

The mounting pin may be used to position a protective fabric liner within the fixture. As noted previously, adapter fixture 100 is devised to be useful in aspects of the larger invention, including the general tensioning of splines. The operation of prior embodiments of the invention, while analogous to those in the print-mounting system herein detailed, include variations of the invention in which splines entrap and tension printed fabric. The inclusion of these alignment and mounting pins allows the implementation and distribution of a universal fixture that can be used compatibly with a wide range of frames within the larger graphic arts system.

Briefly, in the fabric-tensioning application, a piece of fabric is trimmed to an irregular octagon, punched in four locations along the four short sides of the octagon, and mounted via the four holes onto the angled pins. The holes may be precisely and repeatably located through the use of a punch having a tray attached to the platen side of the punch. The tray has a raised, integrally molded fence including one sides conformal to full length of the short side, and two angled stops conformal to abbreviated sections of the long sides, such that the fabric may be laid at a consistent location in the tray, and the fabric pierced by the punch at a predetermined location. In accordance with prior application of the invention, these four holes may be placed over threaded pins.

Figure 5:
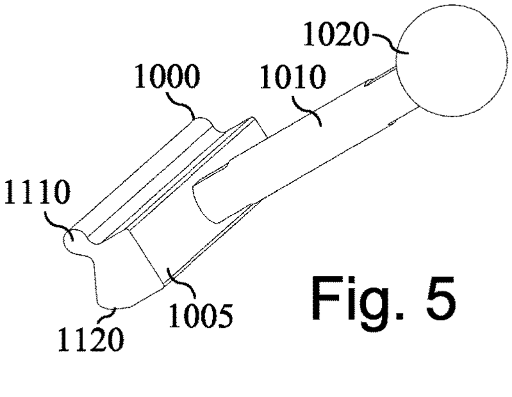
FIG. 5 is a detailed perspective view of a spline insertion tool alone, showing the sectional profile of the tool head extrusion.

With these diverse applications of the invention in mind, the operation of adapter fixture 100 may be more thoroughly understood by reference to the design of the tool shown in FIG. 5, and sequence of actions illustrated in FIGS. 6 through 8, inclusive.

As shown in FIG. 5, installation tool 1000 includes toolhead 1005. The toolhead may be made out of cast, machined, or extruded aluminum, but may also be made of other metals, or any suitably hard plastic. Tool shaft 1010 may be machined from bar stock, and is threaded at each end. Spherical tool knob 1020 prevents slippage as manual force is applied to the tool.

The toolhead has two critical faces that transmit manual force imparted by the operator via the tool handle. Toolhead linear pivot 1110 allows the tool to freely and slidably engaged with tool hook 340. Rotation of the toolhead within the constraint of tool hook 340 imparts a progressive application of force upon a compatibly-dimensioned frame-and-spline system, such as the ones described in this and previously referenced applications.

Toolhead bearing face 1120 is devised to anticipate the progressive insertion of the spline into the rail. Accordingly, the requisite force and the location, in three dimensions, of the line of contact, may vary over the stroke of the tool. The profile of the bearing face will typically depart from a simple radius, and more commonly may be devised to have an elliptical, parabolic, hyperbolic, involute, or cycloidal profile.

Adapter fixture 100 is shown assembled with the fences in their lowered position in FIG. 6. While the four molded quarter-round base components 800 are identical, only one is provided with tool holder 910. The tool holder is used to prevent misplacement of installation tool 1000 when the fixture is not in use. In this figure, all four linkage extrusions 400 are in their raised position, placing the fences in their lowered position, and yielding a hopper-like shape. In this position, the fixture can receive and position a preassembled frame.

Pressing down on the elevated linkage extrusions induces the fences to obtain their raised position. Fence perpendicular extensions 360 entrap the preassembled frame (for clarity of detail, not shown in FIGS. 6 through 8). At this point, the splines are loosely inserted into the rails, toolhead linear pivot 1110 slidably engaged with tool hook 340, and the tool handle rotated downward so that toolhead bearing face 1120 presses upon the splines until the relative position of the splines and rails approximates that shown in FIG. 6. As may be appreciated by reference to installation tool 1000 can be repositioned along each fence and pressure applied to the splines until they are substantially flush with the back of the rails.

This fixture may be used compatibly with the shadowbox-mounted print frame design described in this specification. It is also compatible with frames in which fabric is tensioned over the rails of the preassembled frame by the action of the splines. In this case, a perforation in a fold of fabric is located over the four angled, adjustable pins, and fence perpendicular extensions 360 assist in the folding of the fabric. The splines are then inserted using the fixture and the compatibly designed tool, the frame removed, and the corner pleats turned into the mitered corners using any thin device such as a card or blade, as described in prior embodiments.

Synthetic, polymer, composite, or metal materials may be substituted for the milled wood stock illustrated in the figures, without departing from the invention. Treatments such as aerosols, surface texturing, spacers, deglossers, powders, such as talc or cornstarch, static removers or promoters, are all envisioned within the invention, and various implementations, modifications, and refinements of the invention are envisioned.

In the version of the invention illustrated in FIG. 1, and subsequent depictions of the invention within this specification, it may be appreciated that the completed frame provides a neat and consistent finish, whether viewed from the front or back, that the rails and splines can be made to match perfectly through the application of a conformal covering, that the assembly can be quickly and reliably achieved through the use of compatible alignment and assembly fixtures, that the assembly system is fully reversible, and thereby reduces both material waste and labor, that two differing colors or patterns can be included on the mat board backer, that a print, or a set of prints, can be mounted, in diverse and pleasing ways, using one integrated system, and that the final product can be provided to the end-user in a dependable and attractive package.

Additional details are disclosed in the '418 application that is was incorporated herein previously.

Adapters for Reduced Sized Display Units

FIGS. 9-24 illustrate another device for use with the adapter fixture 100 and more particularly, an adapter 1200 is provided for use with the adapter fixture 100 to allow different sized display units (frames) to be inserted and manufactured using the adapter fixture. As described herein, the adapter 1200 along with other components allows for production of display units (frames) having a 5×7 footprint, a 5×5 footprint (by using a secondary adapter) and a 4×6 footprint (by using another secondary adapter). When manufacture and production of one of these sizes is desired, the user simply inserts the adapter 1200 into the spline installation and locks it in place and then proceeds with production as discussed herein.

In one embodiment, one or more kits can be provided to provide the necessary tools and basic components that are used with the adapter 1200 and the adapter fixture 100 to form the completed product. For example, one or more boxed kits can be provided. A first kit can contain the tools that are used to manufacture the display unit and can be used by a store or processing center that fabricated the product, while the second kit can contain the basic components that are used to fabricate the final product which can be described as a display unit or assembled frame product, etc.

The second kit can include the adapter fixture 100 and also the adapter 1200. Additional tools in the first kit are an L-adapter 1250, a corner tuck tool 1260 (FIG. 9), a hand-held hole punch 1270, scissors 1301 (FIG. 24), and the insertion tool 1000.

As described herein, the adapter 1200 is designed to be inserted into the open center space of the adapter fixture 100 and then operation of the fence extrusions 300 results in the adapter 1200 being securely held in place on the center platform of the adapter fixture 100. In other words and as discussed herein, when the four fence extrusions 300 are raised, they engage the adapter 1200 and clamp it in place. As described herein, this effectively reduces the size of the open space in the center of the adapter fixture 100.

Figure 9:
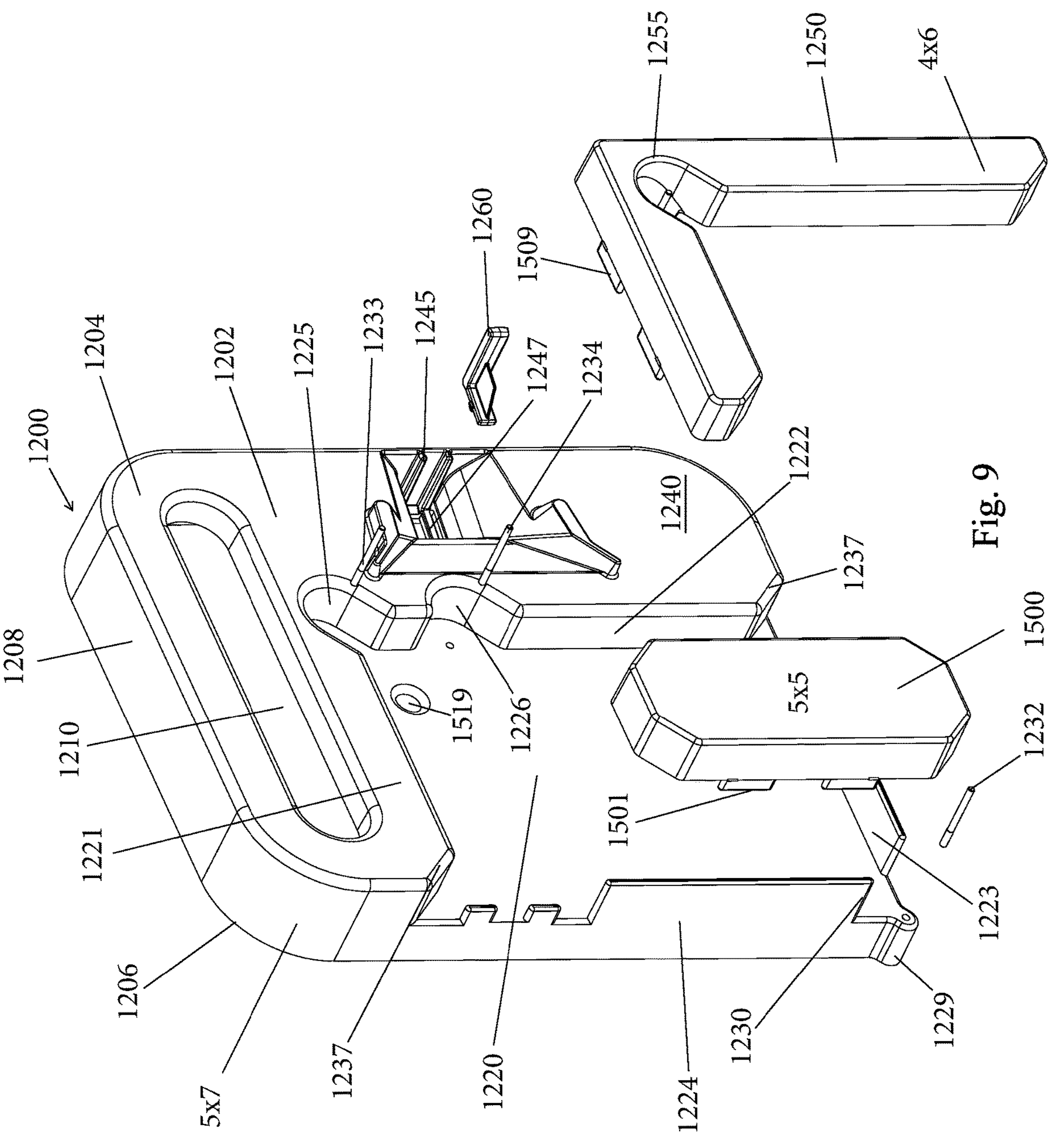
FIG. 9 is an exploded perspective view of adapters for use with the spline insertion tool.
Figure 10:
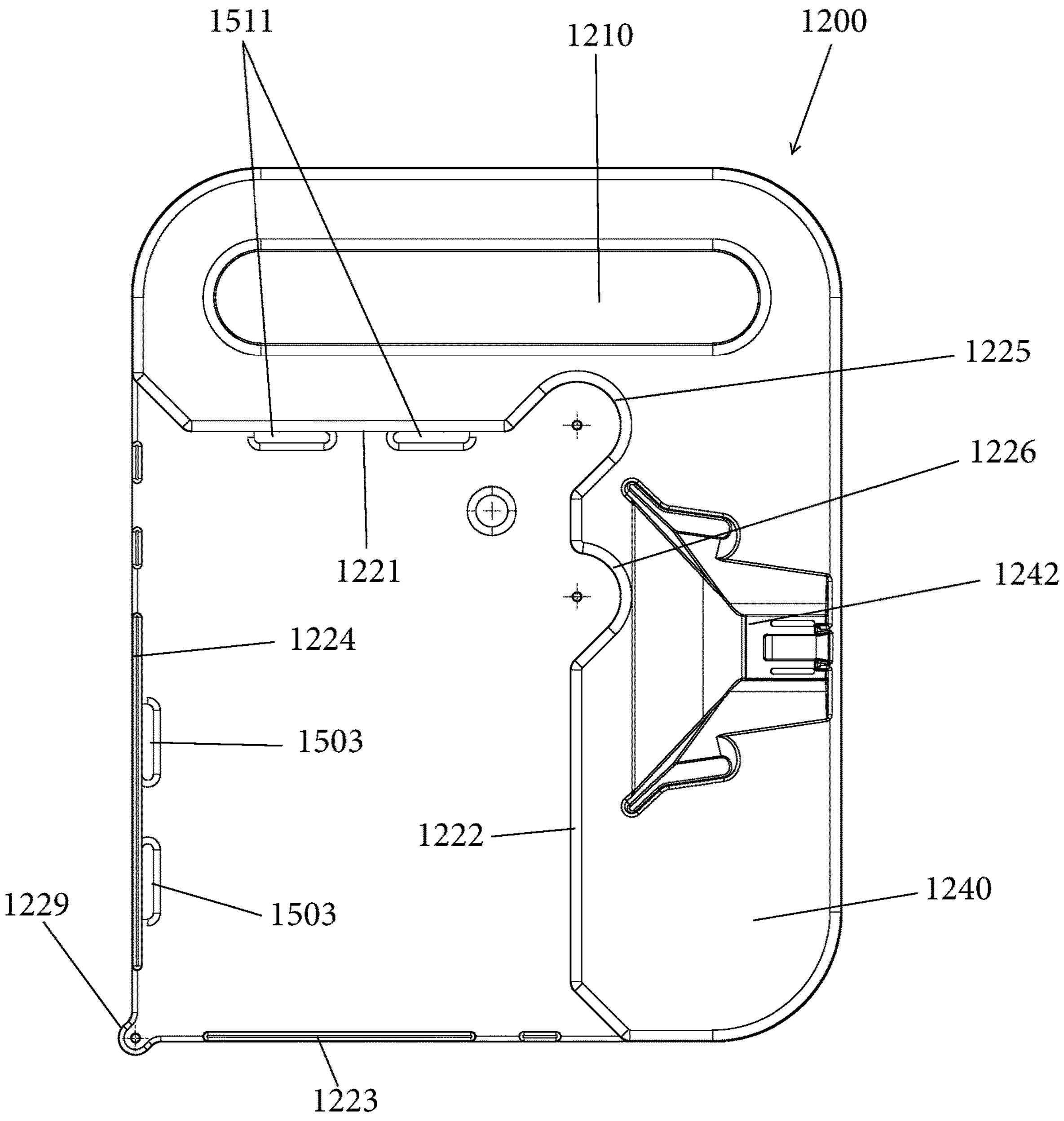
FIG. 10 is a front elevation view of a main adapter.
Figure 12:
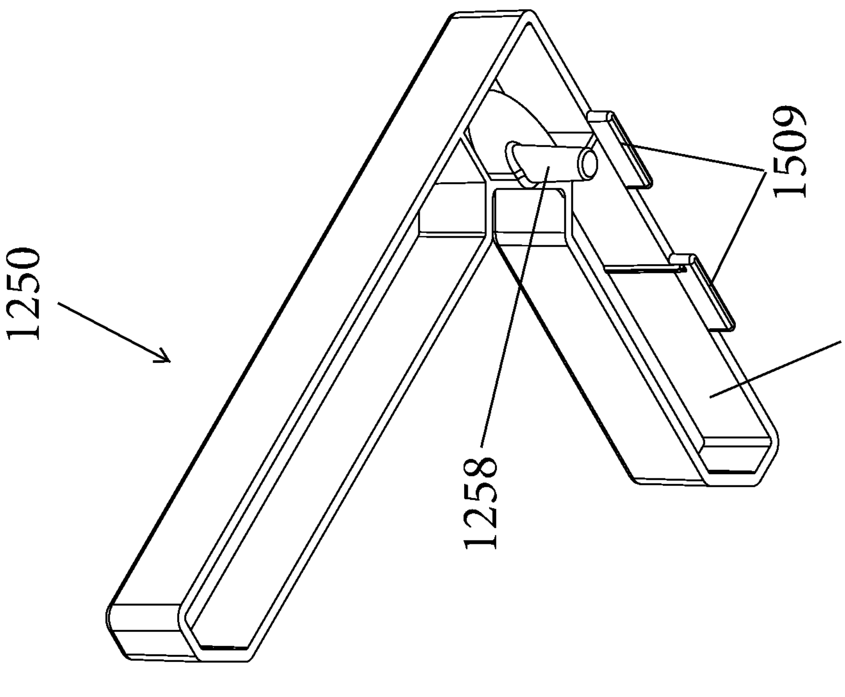
FIG. 12 is a bottom perspective view thereof.

As best shown in FIGS. 9 and 10, the adapter 1200 includes a base 1202 that includes a first face 1204 and an opposing second face 1206. The second face 1206 represents the bottom surface of the adapter 1200 and, as described herein, when the adapter 1200 is inserted into the open center space of the adapter fixture 100. In the illustrated embodiment, the base 1202 has a square or rectangular shape. Along a first edge (first side or end) 1208 of the base 1202, there is an opening 1210 for receiving a hand to permit the user to carry and position and place the adapter 1200 in an in-use position within the adapter fixture 100.

The base 1202 is a hand-held structure that includes an open compartment (open space) 1220 that is defined by a first side wall 1221 that is proximate the opening 1210, a second side wall 1222, a third side wall 1223 that is opposite the first side wall 1221, a fourth side wall 1224 opposite the second side wall 1222. In the illustrated embodiment, the open space 1220 is generally rectangular or square in shape; however, other shapes are possible. The third side wall 1223 and the fourth side wall 1224 can define the outer sides of the base 1202. The second side wall 1222 is not a straight edge but includes several recessed areas or notches. For example, the second side wall 1222 can includes a first recessed area 1225 that defines one corner of the open compartment 1220 and a second recessed area 1226 that is between the first recessed area 1225 and the opposite end of the second side wall 1222. Within each of the first recessed area 1225 and the second recessed area 1226, the second side wall 1222 is curved.

At an outer corner 1229 that is defined between the third side wall 1223 and the fourth side wall 1224, a slot or opening 1230 is formed in that the respective ends of the third side wall 1223 and the fourth side wall 1224 are not continuous and do not intersect.

The adapter 1200 includes a plurality of pins, namely, an upstanding first pin 1232 that is disposed within the outer corner 1229 and is oriented perpendicular to the surface of the base. An upstanding second pin 1233 is disposed within or proximate the first recessed area 1225 and an upstanding third pin 1234 is disposed within or proximate the second recessed area 1226.

The second side wall 1222 can include a bevel 1235 at the end proximate the third side wall 1223 and similarly, the end of the first side wall 1221 that is proximate the fourth side wall 1224 and includes a bevel 1237.

Figure 33:
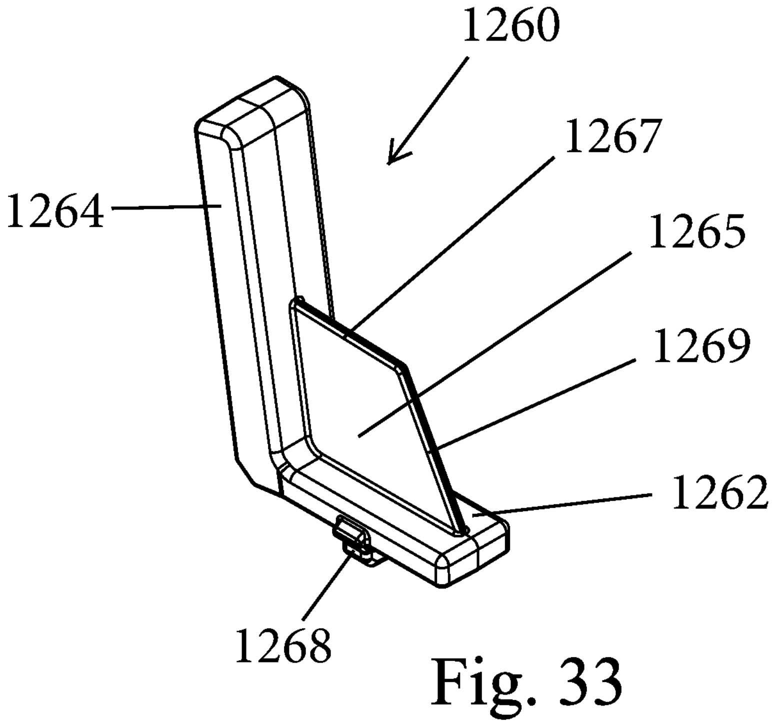
FIG. 33 is a side perspective view of one corner tucking tool.
Figure 35:
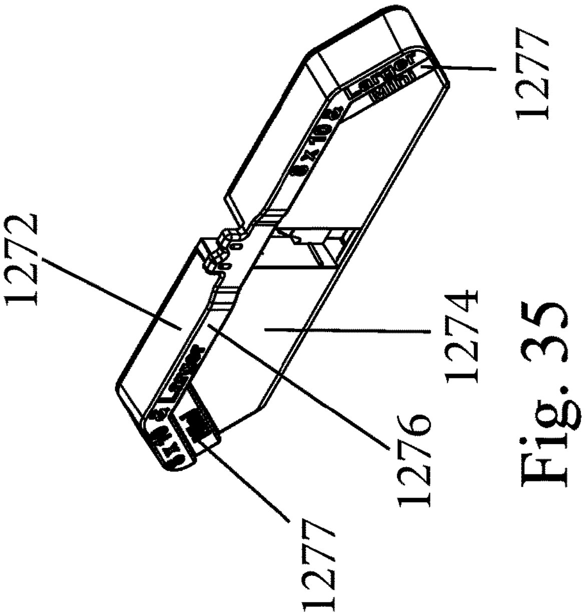
FIG. 35 is a top perspective view of the hole punch base.
Figure 34:
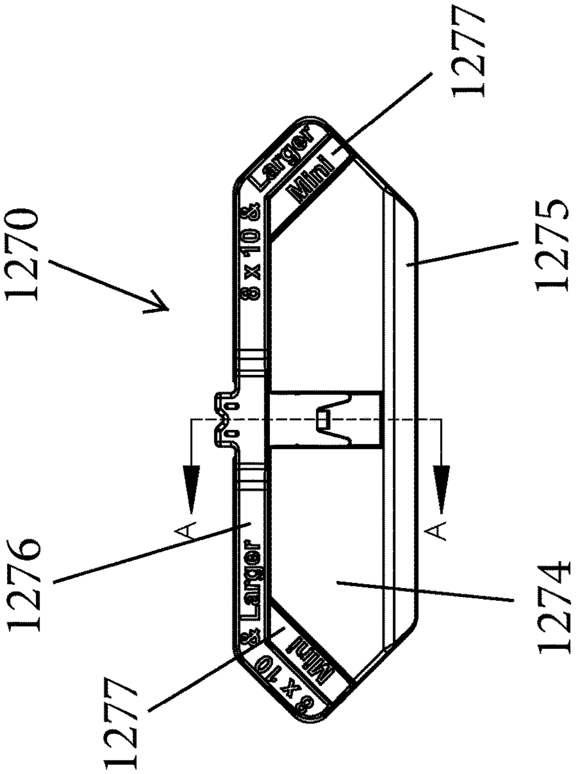
FIG. 34 is a top plan view of a hole punch base.
Figure 37:
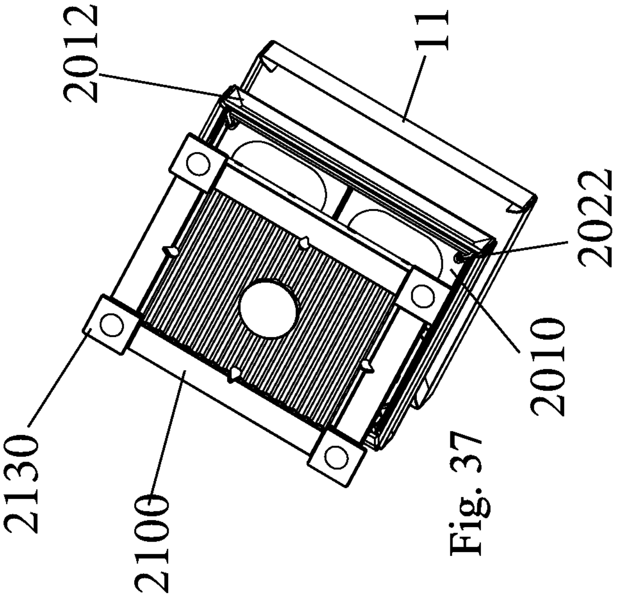
FIG. 37 is an exploded perspective view of the framed canvas product.

Between the second side wall 1222 and an outer wall of the base 1202, there is a raised platform 1240 that is elevated relative to the floor of the open space. The raised platform 1240 extends between the first recessed portion 1225 and the second recessed portion 1226 and the outer wall of the base 1202. The raised platform 1240 can include a recessed portion 1242 (a recessed space or compartment). Within the recessed portion 1242 there can be a first pair of guides or tracks 1245 that run along the inner surface of the outer wall and a second pair of guides or tracks 1247 that run along the floor of the recessed portion 1242. The tracks 1245 can receive the corner tuck tool 1260 that is best shown in FIG. 33. The corner tuck tool 1260 is intended to tuck the corners of the cut canvas substrate 11 into the frame as described below. The tool 1260 is generally L-shaped and lines a leg 1262 and a second leg 1264 with an angle formed between the two legs 1262, 1264 being slightly greater than 90 degrees. Between and fixed to both legs 1262, 1264 is a blade 1265. The blade 1265 has two exposed edges 1267, 1269 that are used to contact and push the corner of the cut canvas substrate 11. Along the sides of the first leg 1262, there are a pair of locking protrusions 1268 that are configured to mate with the tracks 1247 to effectuate a snap-fit between the tool 1260 and the adapter 1200. The second leg 1264 is received between the tracks 1245.

The adapter 1200 can be formed of any number of different materials, including plastic, wood, metal, etc.

Figure 13:
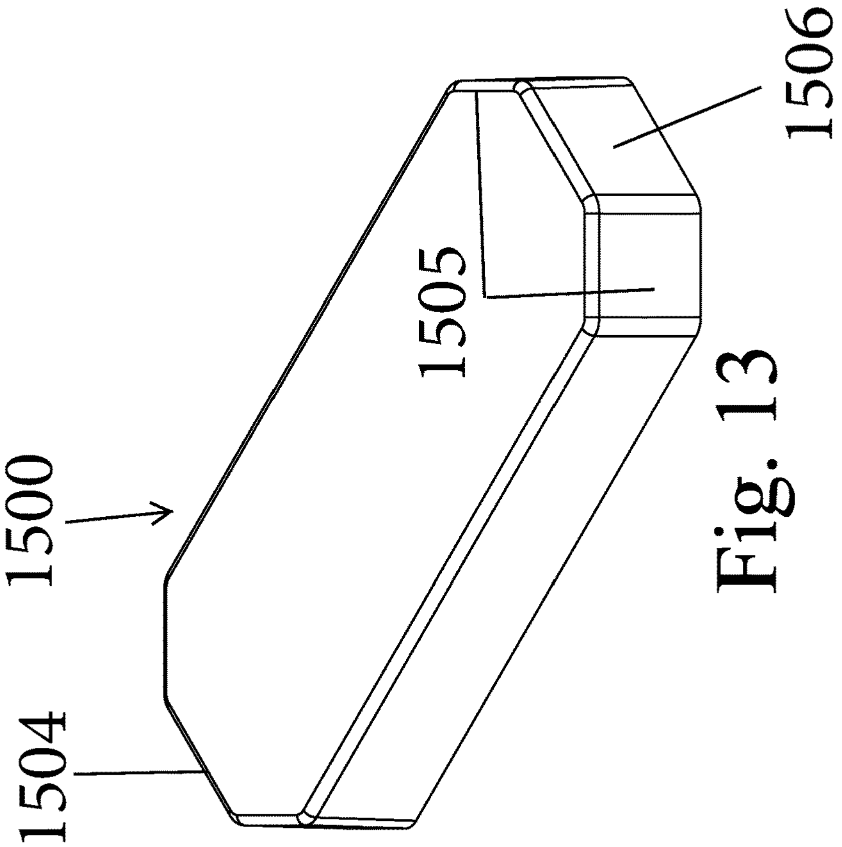
FIG. 13 is a front and side perspective view of another adapter.
Figure 14:
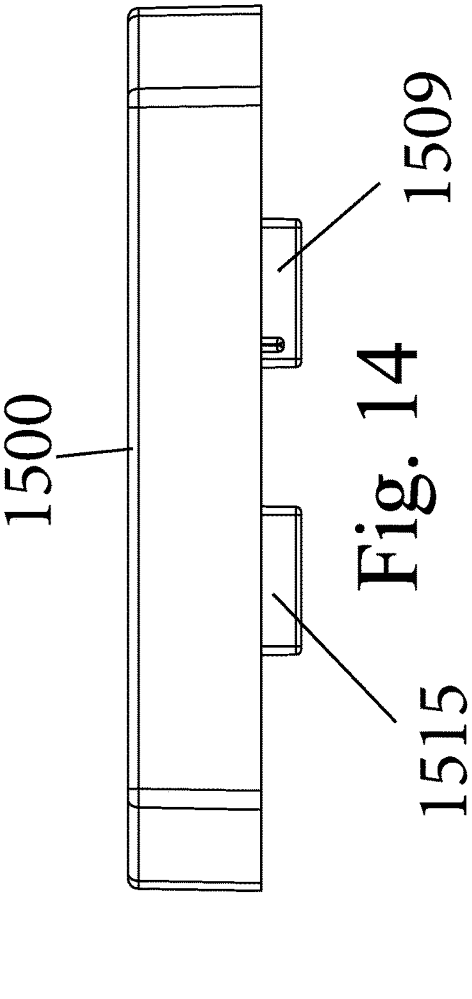
FIG. 14 is a side elevation view thereof.

As shown in FIGS. 9, 13, and 14, a second adapter 1500 can be provided and is intended for use when a 5×5 product is desired to be produced and the second adapter 1500 comprises a block-like structure that is intended for placement and being secured within the open space 1220 of the main adapter 1200. The second adapter 1500 can be in the form of an elongated structure that has first and second ends 1504, 1506. The first and second ends 1504, 1506 are not flat but have angled edges 1505 at the corners of each of the ends 1504, 1506. The two sides of the second adapter 1500 can be flat and the length of the sides is greater than the length of the ends. Along one side of the second adapter 1500 there can be two locating (locking) tabs (protrusions) 1515 (similar or the same as tabs 1509) that protrude downwardly. The locating tabs 1515 are received within two openings 1511 that are formed in the floor of the open space 1220 of the main adapter 1200 along the first side wall 1221. The reception of the locating tabs 1515 into openings 1511 thus prevents movement of the second adapter 1500 along the floor of the main adapter 1200. The openings 1511 are located along the first side wall 1221. There are also a pair of openings 1503 that receive the locating tabs 1515 when the second adapter 1500 is in a storage position along the fourth side wall 1224. In this position, both adapters 1250, 1500 can be stored in the space 1220.

When the second adapter 1500 is positioned along the first side wall 1221, the pin 1234 is accessible and is used to secure one corner of the canvas.

Figure 11:
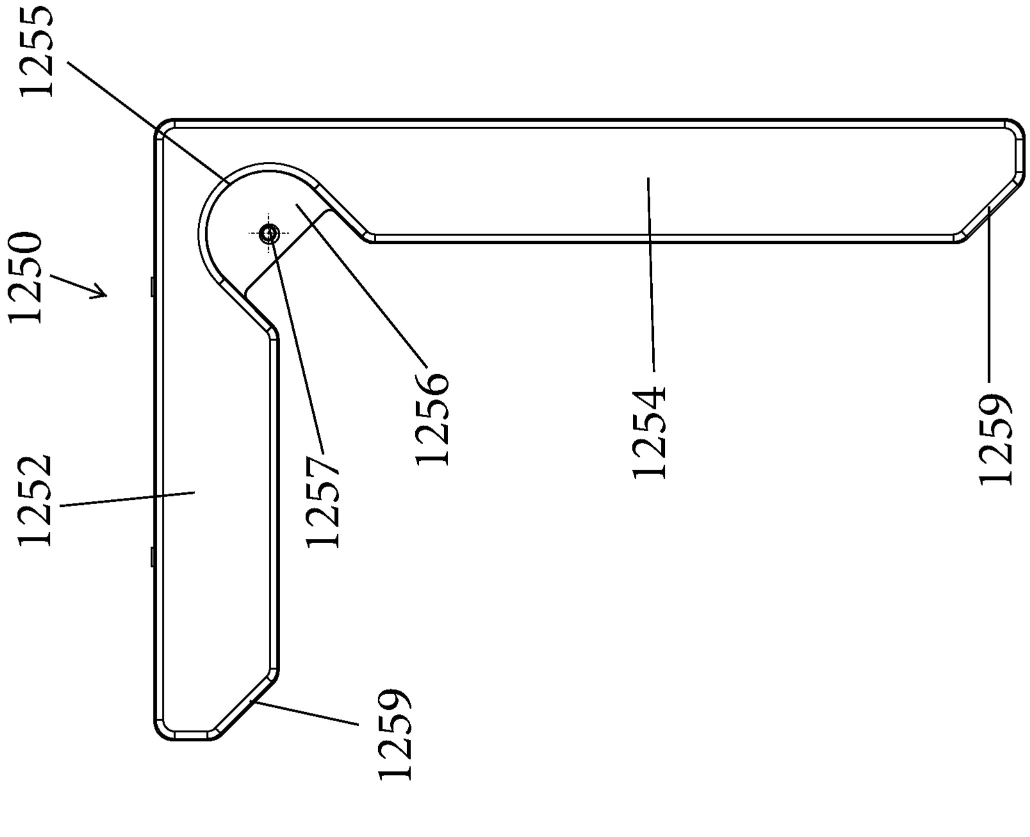
FIG. 11 is a front elevation view of an L-adapter.

The L-adapter 1250 is intended for use when a 4×6 product is desired to be produced and the L-adapter 1250 comprises an L-shaped structure that is intended for placement and being secured within the open space 1220 of the main adapter 1200. As shown in FIG. 11, the L-adapter 1250 includes a first leg 1252 and a second end 1254 that is joined to the first leg 1252. The legs 1252, 1254 can be joined at a 90 degree angle and thus a right angle corner is defined. Within this corner, there can be a recessed portion 1255 that can generally be U-shaped. The recessed portion 1255 has a planar floor 1256 with an upstanding fourth pin 1257 being provided and secured to the floor 1256. The fourth pin 1257 thus can be perpendicular to the floor 1256.

There are several locating features for locating and securing the L-adapter 1250 to the open space 1220 of the main adapter 1200. More specifically, along an underside of the L-adapter 1250, there is a protrusion 1258 that extends outwardly from the underside and is configured to be received within an opening (blind hole) 1519 formed in the floor of the open space 1220 proximate the first side wall 1221 and proximate the first recessed portion 1225.

The first leg 1252 terminates in a first end and the second leg 1254 terminates in a second leg. At each of these ends, a beveled section 1259 can be provided.

In use, the first leg 1252 is positioned against the first side wall 1221 and the second leg 1254 is positioned against the second side wall 1222. It will be appreciated that insertion of the L-adapter 1250 into the open space 1220 results is the first and second recessed portions 1225, 1226 being covered and thus, the pins 1233, 1234 are also closed off from the open space 1220 and are prevented from being used. It is in view of this that the L-adapter 1250 has its own pin 1257 that is provided for holding the canvas substrate 11 as described herein.

Figure 25:
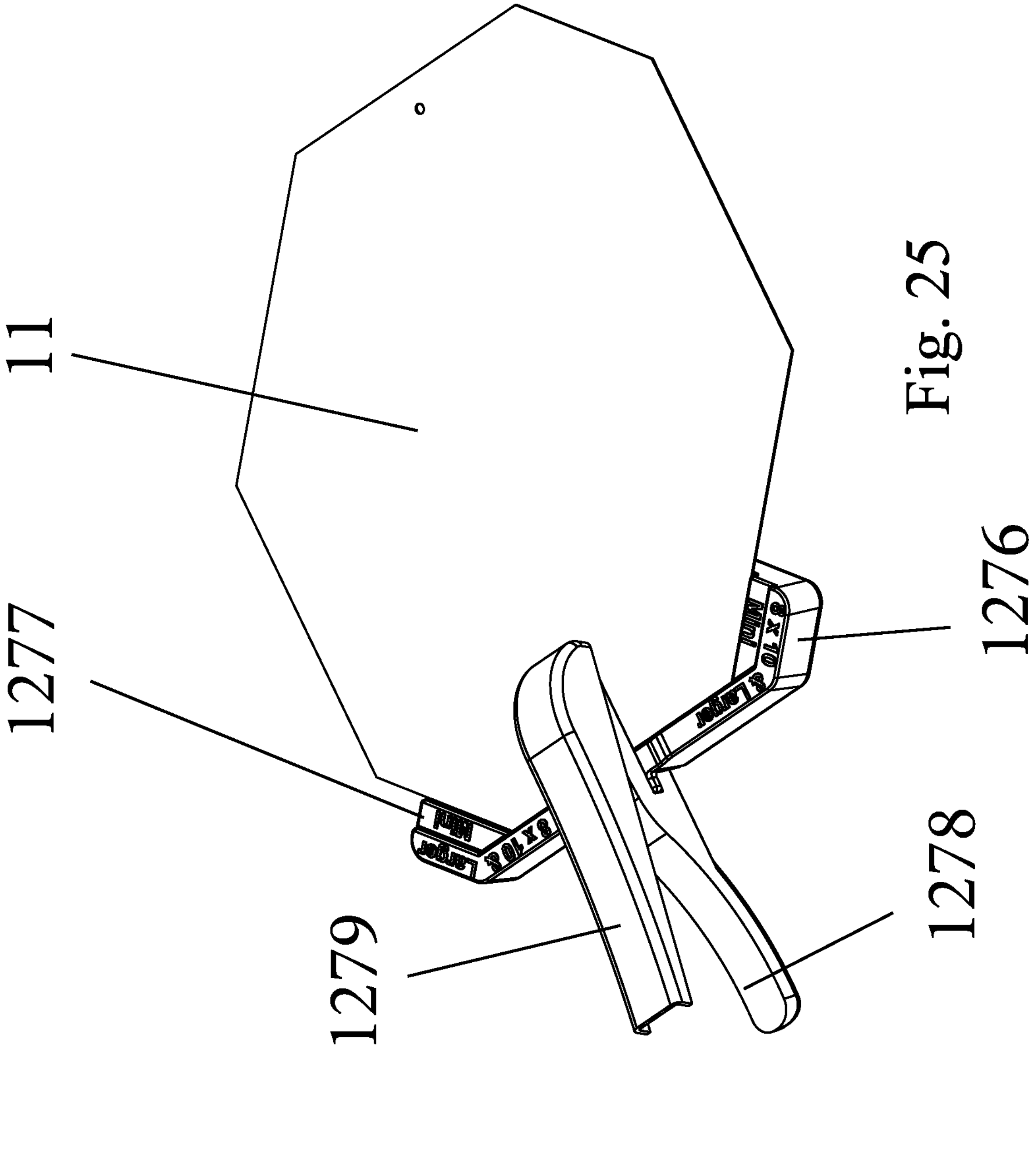
FIG. 25 shows a subsequent step of punching a hole in the canvas substrate.

As shown in FIG. 25, the hand-held hole punch 1270 is constructed to work with multiple sized canvas substrates 11. The punch 1270 has a base portion 1272 and a mechanical punch that when operated punches a hole in an object, in this case the canvas substrate 11. The base portion 1272 is a multi-layer structure which is purposely design with such construction to allow multiple sized canvas substrates 11 to be used with the punch 1270, while guaranteeing that the formed hole is in the desired location. More specifically, the base portion 1272 has a first surface 1274 which represents the first level and extends to an inner beveled edge 1275. Opposite the inner beveled edge 1275, there is a raised rail 1276 that is at the outer edge of the first surface 1274. The rail 1276 is raised relative to the first surface 1274 and thus, an edge or shoulder is formed. The rail 1276 has a linear section and two angled ends. The base portion 1272 includes a step or ledge 1277 that is located between the first surface 1274 and each of the angled ends of the raised rail 1276. The ledge 1277 is thus raised relative to the first surface 1274 but lower than the rail 1276 and thus, the ledge 1277 is in the form of a step between the first surface 1274 and the rail 1276.

The first surface 1274 thus has a linear edge and two angled edges at the ends of the linear edge. The linear edge is defined by the rail 1276 and the two angled edges are defined by the two platforms 1277. The first surface 1274 thus defines a first canvas receiving platform. Similarly, the ledges 1277 define the second canvas receiving platform for receiving a canvas having larger dimensions. When the canvas substrate 11 is receiving on the second canvas receiving platform, the canvas substrate 11 sits on the ledges 1277.

The punch 1274 has a fixed jaw 1278 and a movable jaw 1279. The movable jaw 1279 thus pivots relative to the fixed jaw 1278. Along the underside of the movable jaw 1279, there is a blade which is in the form of a cylindrical shaped protrusion that extends downwardly. The end of the movable jaw 1279 where the blade is located is positioned over the first surface 1274 at a location spaced from the rail 1276. Thus, the hole that is formed by the blade is spaced from the rail 1276. Once the canvas substrate 11 is received on one of the platforms, the hole is formed in the canvas substrate 11 by pressing down the movable jaw 1279.

It will be appreciated that, as described herein, the shape of the canvas substrate 11 is complementary to the shape of the platform. The outer edge of the canvas substrate 11 in either the first platform or second platform seats against the rail 1276. This ensures that for each of the different sized canvas substrates 11, the formed hole is located the same distance from the outer edge of the canvas substrate 11.

Figure 22:
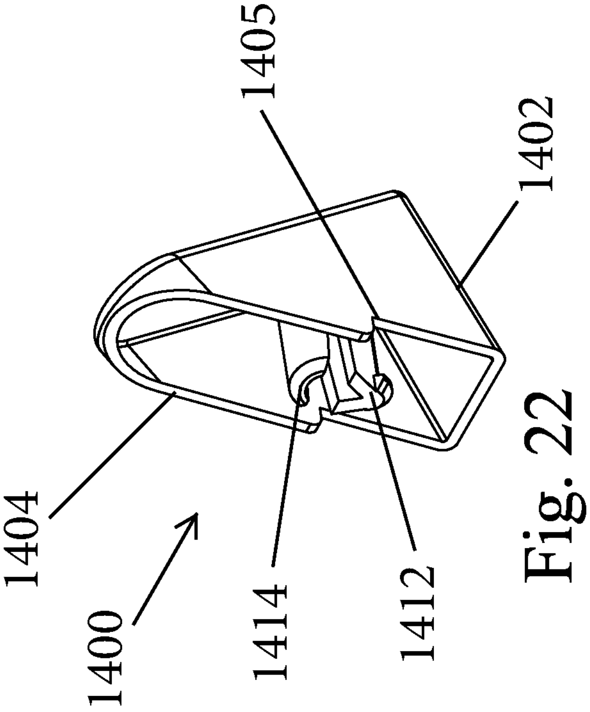
FIG. 22 is a rear and side perspective view of a stand for use with the display unit.
Figure 23:
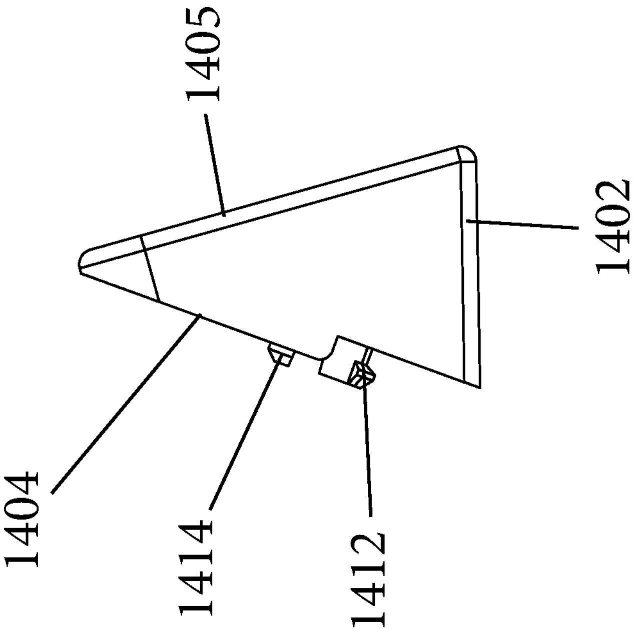
FIG. 23 is a side elevation view thereof.

The second kit can consist of a box that contains the other components of the second kit. For example, the other components can consist of one or more display units which consist of one or more frames 1320 and one or more rear panels 1330. As described herein, one frame 1320 mates with one rear panel 1330 to define one display unit. Other parts/tools that can be included in the second kit comprise corner caps, such as corner caps 1600 (FIG. 30), and an easel or stand 1400 (FIGS. 22 and 23).

In one embodiment, the frame 1320 and rear panel 1330 are formed of a plastic material and can be formed as a molded structure.

Figure 16:
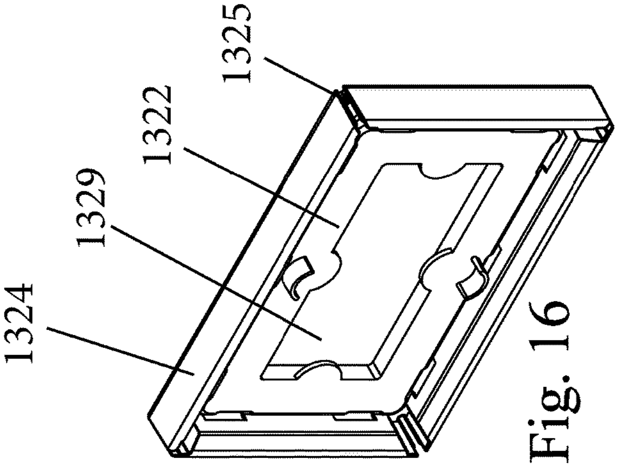
FIG. 16 is a rear perspective view thereof.
Figure 17:
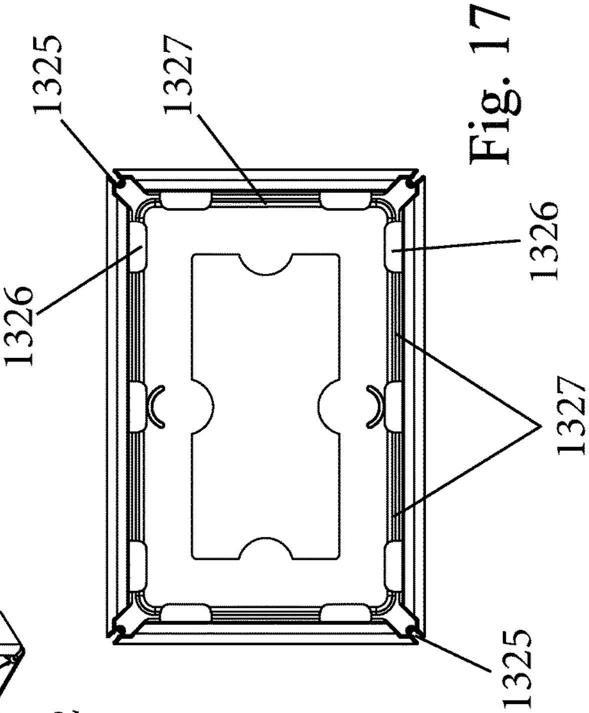
FIG. 17 is a rear elevation view thereof.
Figure 15:
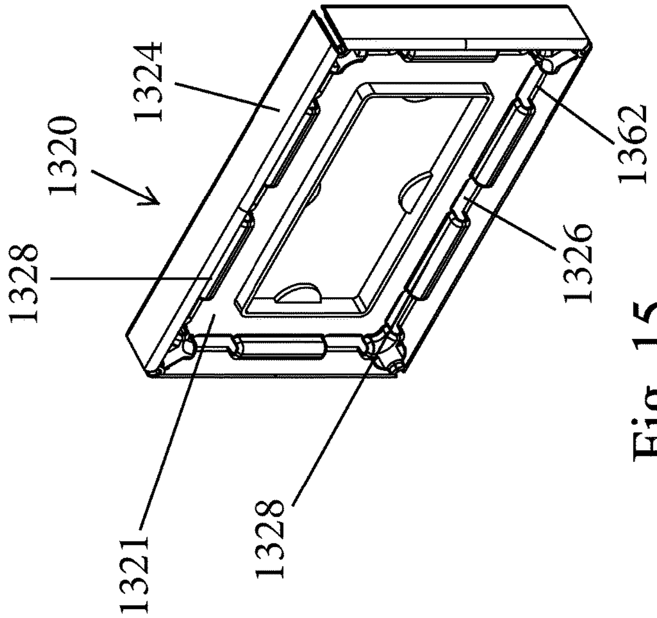
FIG. 15 is a front perspective view of a frame member of a display unit.
Figure 18:
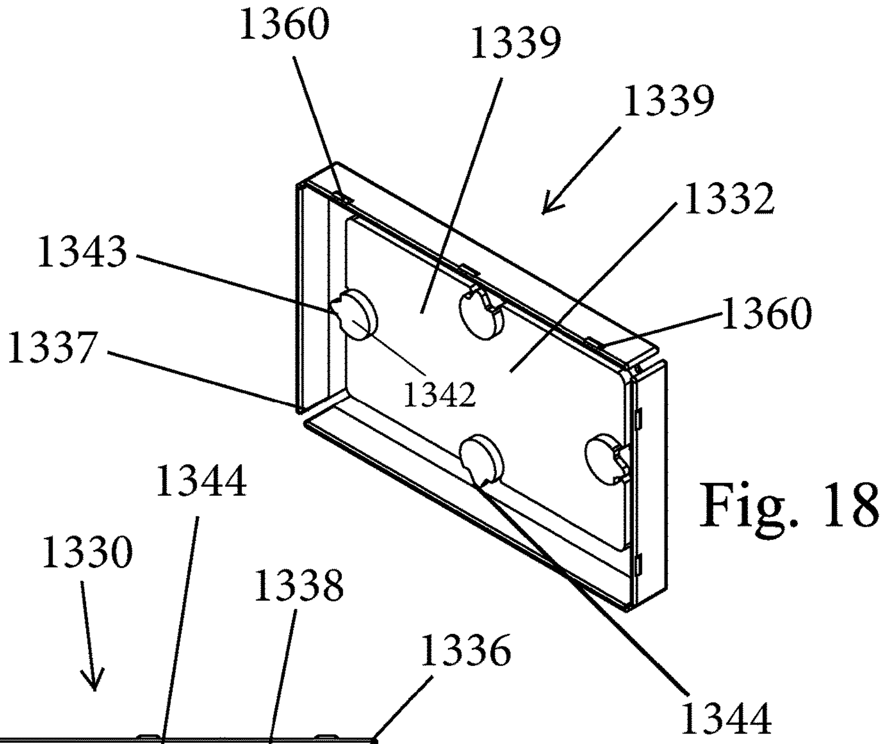
FIG. 18 is a front perspective view of a rear panel of the display unit.

As shown in FIGS. 15-17, the frame 1320 represents the part that is placed into contact with the rear surface of a canvas substrate 11 and about which the canvas substrate 11 is folded. The frame 1320 has a front face 1321 which faces the canvas substrate 11 and an opposite rear face 1322 that faces and engages the rear panel 1330. The frame 1320 has side walls 1324 and can have a center platform 1329 with a center hole. The center platform 1329 is connected to the side walls 1324 by a plurality of bridges or connectors (connecting walls) 1328.

Each of these connectors 1328 has a curved construction such that along the rear face 1322, each connector 1328 has a concave appearance and defines a trough 1327 which functions as a groove or channel for receiving the canvas substrate 11 as described herein. In other words, each connector 1328 can have a U-shape. From the rear, the connectors 1328 are thus recessed relative the center platform.

As shown, each side wall 1324 can have one or more connectors 1328 that is formed therealong and at least some of the connectors 1328 can be linear in nature. The troughs 1327 define a canvas receiving groove (channel) and more particularly, the groove or channel is defined between the troughs 1327 and the side walls 1324. As described later, the canvas substrate 11 is received within and held taut (under tension) and in place within the groove due to the interaction and engagement between the rear panel 1330 and the frame 1320.

Between the connectors 1328, slots or openings 1326 are formed in the frame 1320 and more particularly, the openings 1326 are formed at the bottom of the side walls 1324. In the illustrated embodiment, the longer side walls 1324 contain three openings 1326, while the shorter side walls 1324 contain two openings 1326.

As shown in FIGS. 16 and 17, the corners of the frame 1320 contain slots 1325. These slots 1325 are aligned with the corner slots of the rear panel 1330 when the frame 1320 and rear panel 1330 mate together.

The rear panel 1330 defines the rear of the display unit and includes a front face 1332, an opposite rear face 1334 and a plurality of corners 1336. The rear panel 1330 can be formed to have any number of different shapes, such as a square or a rectangle (as shown).

The rear panel 1330 has a rear wall or floor 1331 with a peripheral side wall 1333 that extends around the periphery of the floor 1331. The plurality of corners 1336 have slots 1337 defined thereat. The slots 1337 can be thought of as being breaks within the side wall 1333 (defined by folded corner portions). The slot 1337 can be U-shaped or it can include a linear slot that leads to a circular opening so as to generally have a keyhole shape.

The front face 1332 faces the frame 1320, while the rear face 1334 faces away and defines the rear surface of the display unit. The rear face 1334 can include a center recessed area 1338. The front face 1332 also includes an opposite center raised area 1339 which can have the same footprint as the center recessed area 1338.

Along the area 1338 there can be a plurality of recessed openings 1340 that are formed at select locations and as discussed herein, can be referred to as being hanging holes. In the illustrated embodiment, there are four openings 1340 with each opening 1340 having a U-shaped portion with a rounded beak portion (recessed extension) protruding outwardly from the U-shaped portion and formed in a border region that is elevated relative to the recessed area 1338. The openings 1340 can be arranged as two pairs, with one pair being directly opposite one another at ends of the recessed area 1338 and the other pair being directly opposite one another at sides of the area 1338.

The hanging openings 1340 are arranged to permit the assembled display unit to be displayed in both portrait format and landscape format. Thus, one opposing pair of the openings 1340 are for landscape format and the other opposing pair of the openings 1340 are for portrait landscape. In addition, each opening 1340 is specifically formed so as to receive multiple types of hanging hardware. For example, a traditional fastener, such as a nail or screw, can be used and inserted into the U-shaped portion and then slid into the rounded peak portion. In addition, the opening 1340 is also sized to receive a head (e.g., mushroom shaped head) of a traditional suction cup to allow the display unit to be attached to a support surface (e.g., wall, mirror, etc.) using the suction cup. The head of the suction cup can be slid into the beak portion as well.

As shown in the figures, one exemplary hanging opening 1340 has an irregular shape. The hanging opening 1340 can includes a first region 1342 and a second region 1344. The first region 1342 defines one end of the hanging opening 1340, while the second region 1344 defines the other end of the hanging opening 1340. The first region 1342 can be generally U-shaped, while the second region 1344 is generally parabolic shaped. In addition, an interface 1343 between the first region 1342 and the second region 1344 can comprise a shoulder that is formed at a right angle to the ends of the U-shaped first region 1342. The width of the parabolic second region 1344 is less than a width of the U-shaped first region 1342. As shown, the heights of the first region 1342 and the second region 1344 can be different in that the first region 1342 can be shorter than the second region 1344 due to a stepped construction of the rear face of the rear panel 1330.

As shown in the figures, the rear face of the rear panel has a stepped construction with an outer perimeter border being raised relative to a center section of the rear panel. The first region 1342 is formed in the outer perimeter border and the second region 1344 being formed in the center section and the interface 1343 comprising a shoulder between the outer perimeter border and the center section. The interface 1343, which can have a planar component, extends from legs of the U-shaped first region 1342 to an entrance into the parabolic shaped second region 1344. The interface 1343 can comprise a planar interface located at an open end of the U-shaped first region 1342 and laterally outside of an open end of the parabolic second region 1344.

The first region 1342 is closer to a center of the rear panel and the second region 1344 is closer to an outer perimeter edge of the rear panel.

Figure 20:
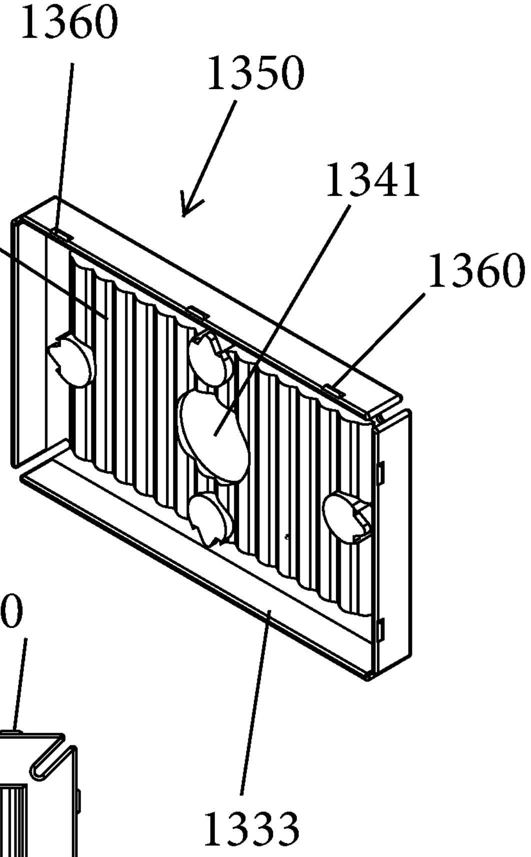
FIG. 20 is a front perspective view of another rear panel of the display unit.
Figure 21:
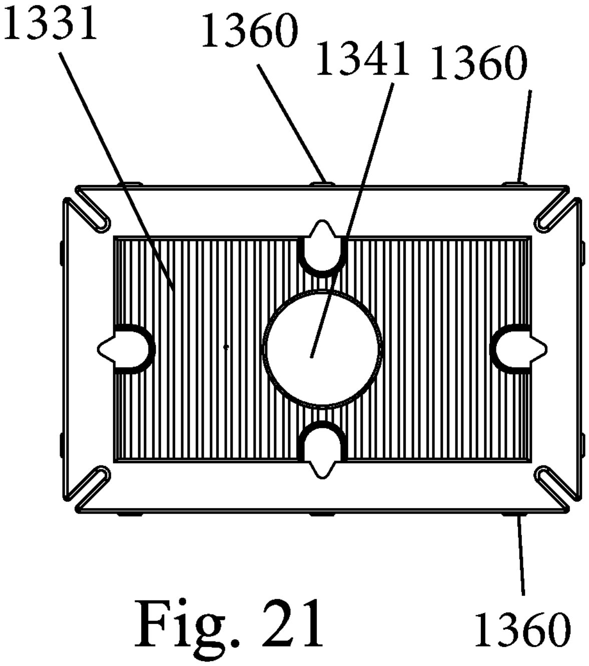
FIG. 21 is a rear elevation view thereof.

FIGS. 20 and 21 illustrate another rear panel 1350 according to an alternative embodiment. The rear panel 1350 and rear panel 1330 are similar and therefore, like elements are numbered alike. The rear wall or floor 1331 has a corrugated (bellows) type construction defined by a series of valleys and peaks. A center opening 1341 can also be provided in the rear wall.

The frame 1320 and rear panel 1330 are configured to mate with one another so as to capture and retain the canvas substrate 11 in place and under tension over the front face of the frame 1320. A mechanical fit (engagement) can be provided between the frame 1320 and the rear panel 1330. For example, a reversible snap-fit can be formed between the frame 1320 and the rear panel 1330. In one embodiment, the side walls 1333 of the rear panel 1330 include locking tabs 1360 that are formed along the exterior faces of the side walls 1333. The locking tabs 1360 can be located at or proximate one edge of the respective side wall 1333. The locking tabs 1360 can have any number of shaped including being rectangular as shown. In the illustrated embodiment, there are three locking tabs 1360 formed along each side wall of one pair of opposing side walls 1333 and there can be two locking tabs 1360 formed along each side wall of the other pair of opposing side walls 1333.

The locking tabs 1360 are specifically located and positioned so that when the rear panel 1330 is inserted into the rear of the frame 1320, the locking tabs 1360 engage locking edges 1362 that form part of the openings 1326 formed in the frame 1320. In other words, when the rear panel 1330 is inserted into the rear of the frame 1320 the side walls 1333 of the rear panel 1330 are disposed internally within the side walls 1324 of the frame 1320 with the canvas substrate 11 being captured therebetween as described in more detail below. Thus, when the canvas substrate 11 is draped over the side walls 1324 of the frame 1320 and the rear panel 1330 is inserted, the locking tabs 1360 contact the canvas substrate 11 and as the rear panel 1330 is pushed further into the frame 1320, the locking tabs 1360 travel along the canvas substrate 11 and the side walls 1324 until the locking tabs 1360 clear the side walls 1324 and engage the locking edges 1362 formed along the side walls 1324 of the frame 1320. This results in a reversible snap-fit between the frame 1320 and the rear panel 1330 with the canvas substrate 11 being captured therebetween.

In this engaged position, the hanging openings 1340 face rearward and are open and accessible.

As shown in FIGS. 22 and 23, the stand 1400 is configured to mate with one of the hanging openings 1340 (FIG. 19) to allow the assembly display unit to be displayed either in portrait of landscape format. The stand 1400 is generally a hollow structure with a planar base 1402 for seating against the ground and an angled inner wall 1404 and a sloped outer surface 1405.

Along the inner wall 1404 there is an engagement protrusion that is configured to be frictionally received and held within the hanging opening 1340. The engagement protrusion can be formed of a first part 1412 that can have an upside down U-shape and a second part 1414 that can be fin shaped or arcuate shaped. The first part 1412 is received within the U-shaped portion of the hanging opening 1340 and the second part 1414 is received within the rounded beak portion of the handing opening 1340 so as to frictionally secure the stand 1400 to the rear panel 1330 and allow display of the display unit.

A shoulder 1409 is formed along the inner wall 1404. When the stand 1400 is mated to the rear panel 1330, the shoulder 1405 seats against an edge that defines the center recessed area 1338 (FIG. 19) of the rear face of the rear panel 1330.

It will also be appreciated that, as discussed in more detail below, the acts of placing the frame 1320 along a rear surface of the canvas substrate 11 and then folding the canvas substrate 11 over the side walls 1324 of the frame 1320 (FIG. 15) and then inserting and snap-fittingly engaging the rear panel 1330 to the frame 1320 results in the canvas substrate 11 being placed under tension (being stretched to a taut condition). In other words and as described below, this construction causes the folded edges of the canvas substrate 11 to be pushed inward toward the frame 1320 causing the center portion of the canvas substrate 11 to be stretched tight across the frame 1320.

Assembly of the Display Unit (Framed Canvas)

According to one embodiment, the first step is to place the main adapter 1200 in place within the center platform (open space) of the adapter fixture 100. In all cases, the main adapter 1200 is used. The main adapter 1200 is for use with a 5-×7 canvas. In the event that the desired canvas size is not 5×7, then one of the other adapters 1250, 1500 is used in combination with the main adapter 1200 as described herein. More specifically, the L-adapter 1250 is used for a 4×6 canvas, and alternatively, the adapter 1500 (FIGS. 13 and 14) is used for a 5×5 canvas.

Figure 28:
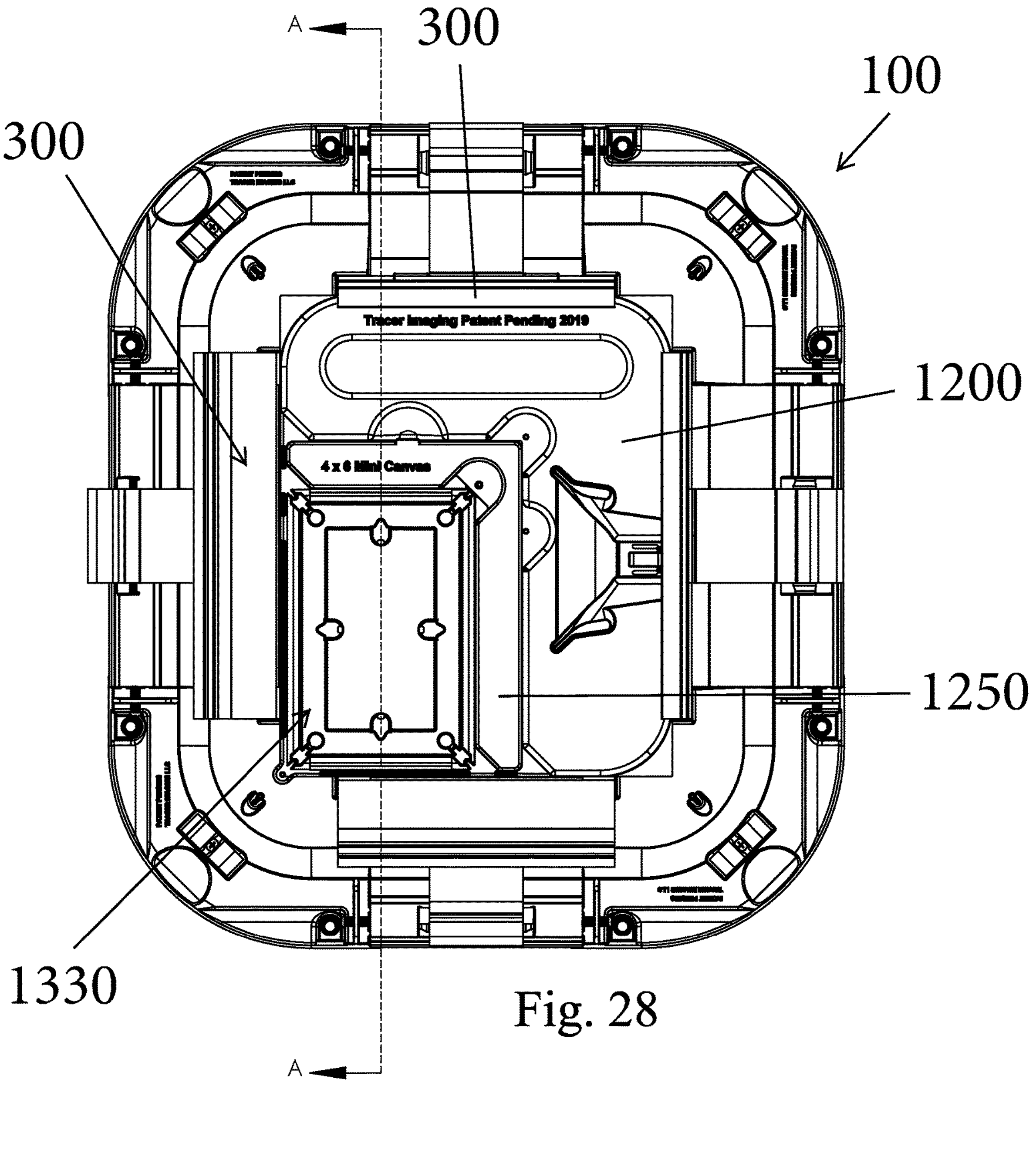
FIGS. 28 and 29 show the step of inserting the rear panel into the frame.

FIG. 28 show the L-adapter 1250 being used and inserted into the open space 1220 and secured thereto in the manner described hereinbefore.

Figure 24:
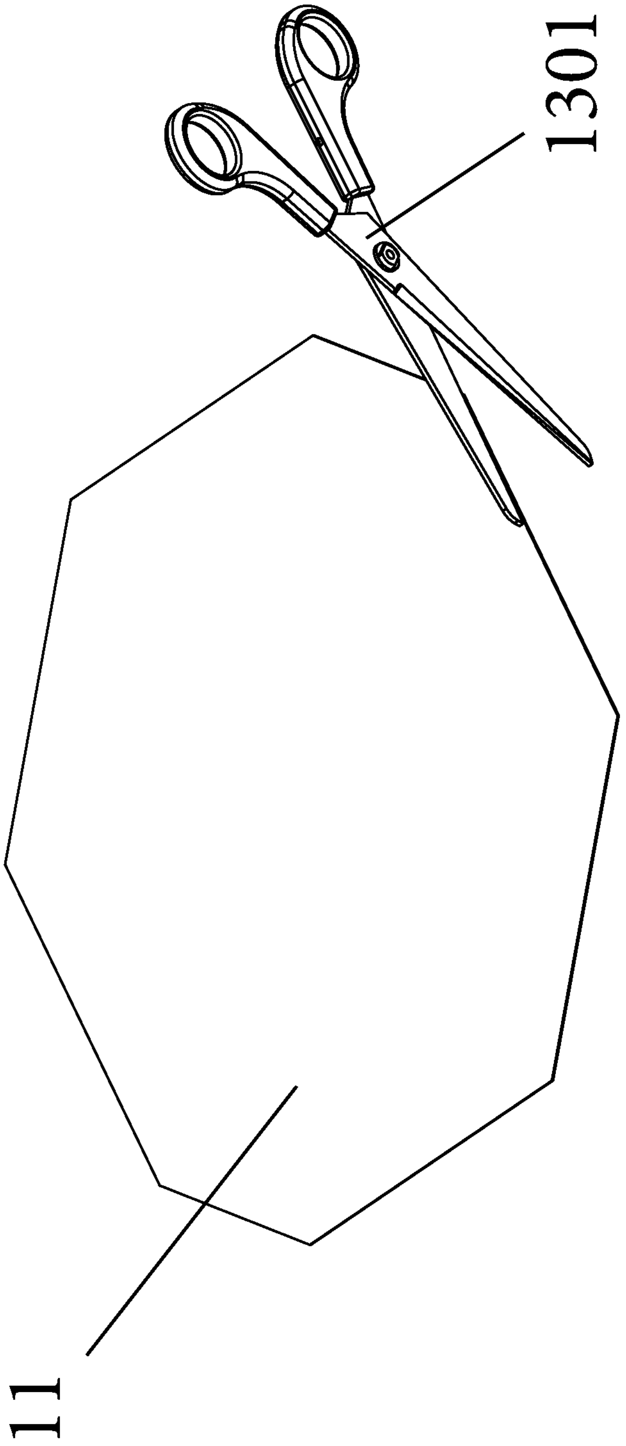
FIG. 24 is a view of the canvas substrate being cut along cut lines to form a canvas with cut corners.

As shown in FIG. 24, the canvas substrate 11 is prepared. The canvas substrate 11 can include dotted cut lines that are formed (e.g., printed) on the canvas substrate 11. The user is to cut the canvas substrate just outside the dotted cut lines that define the border of the cut canvas substrate 11. In effect, the corners of the canvas substrate 11 are cut to form an octagonal shaped canvas substrate 11.

Next as shown in FIG. 25, the next step is to form the holes in the canvas substrate 11 using the hand-held hole punch 1270. The diagonal sides of the canvas substrate 11 are aligned with the punch tool 1270 and the movable jaw (handle) 1279 is pressed down to form a hole in the canvas. In the illustrates embodiment, the canvas substrate 11 is shown on the first platform. This step is repeated on the opposite diagonal side results in a pair of holes being formed in the canvas substrate 11 opposite one another.

Figure 26:
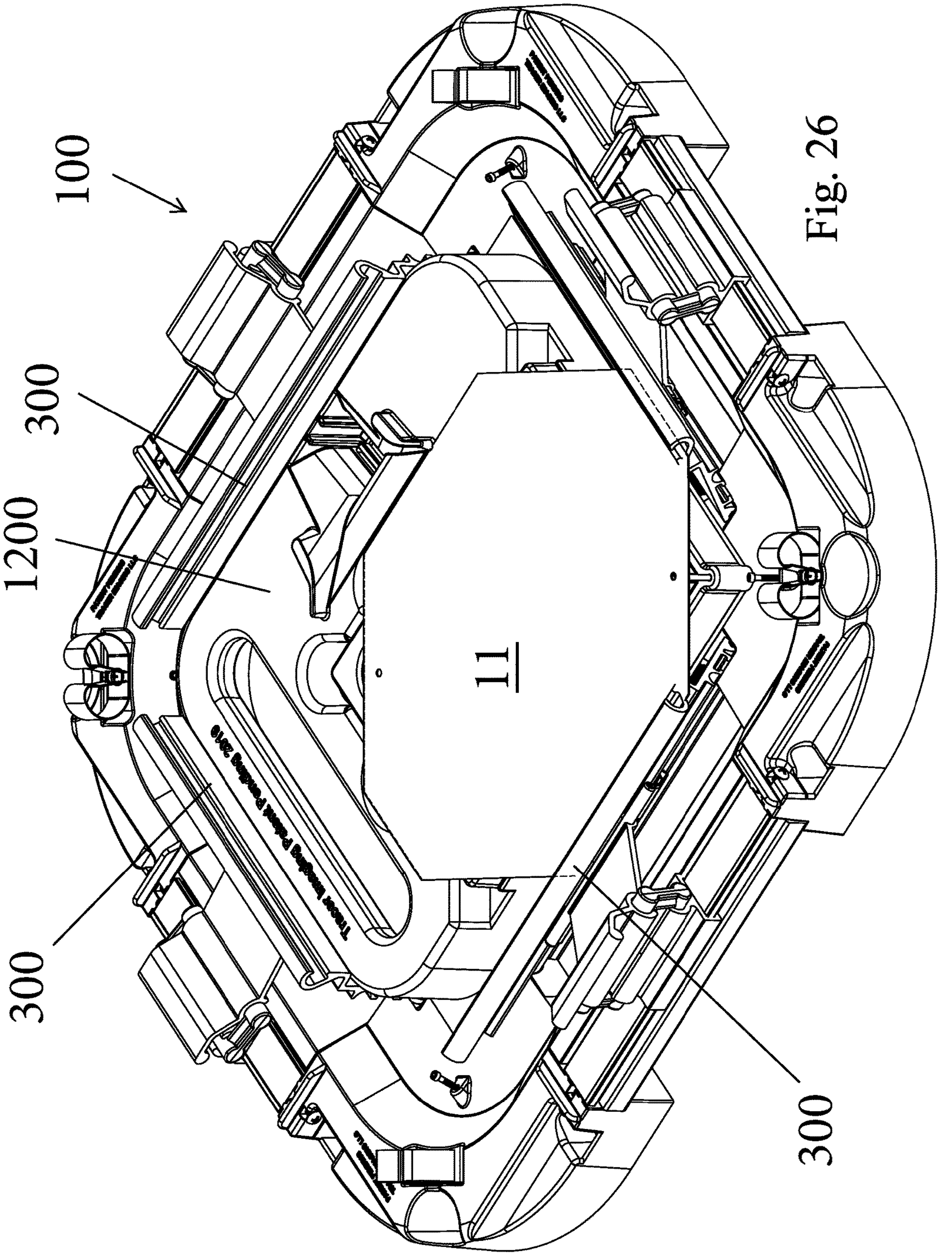
FIG. 26 shows a step of placing the canvas substrate face down on the adapter.

Next the canvas substrate 11 with holes is placed into the open space 1220 of the adapter 1200 as shown in FIG. 26. FIG. 26 shows the canvas substrate 11 being used with the L-adapter 1250. The canvas substrate 11 is placed face down (printed/graphic side down) and the pin 1257 of the L-adapter 1250 is inserted through one hole of the canvas substrate 11 and the pin 1232 is inserted through the other hole of the canvas substrate. The effectively secures and holds the canvas substrate 11 in place to allow the subsequent steps to be performed.

Figure 27:
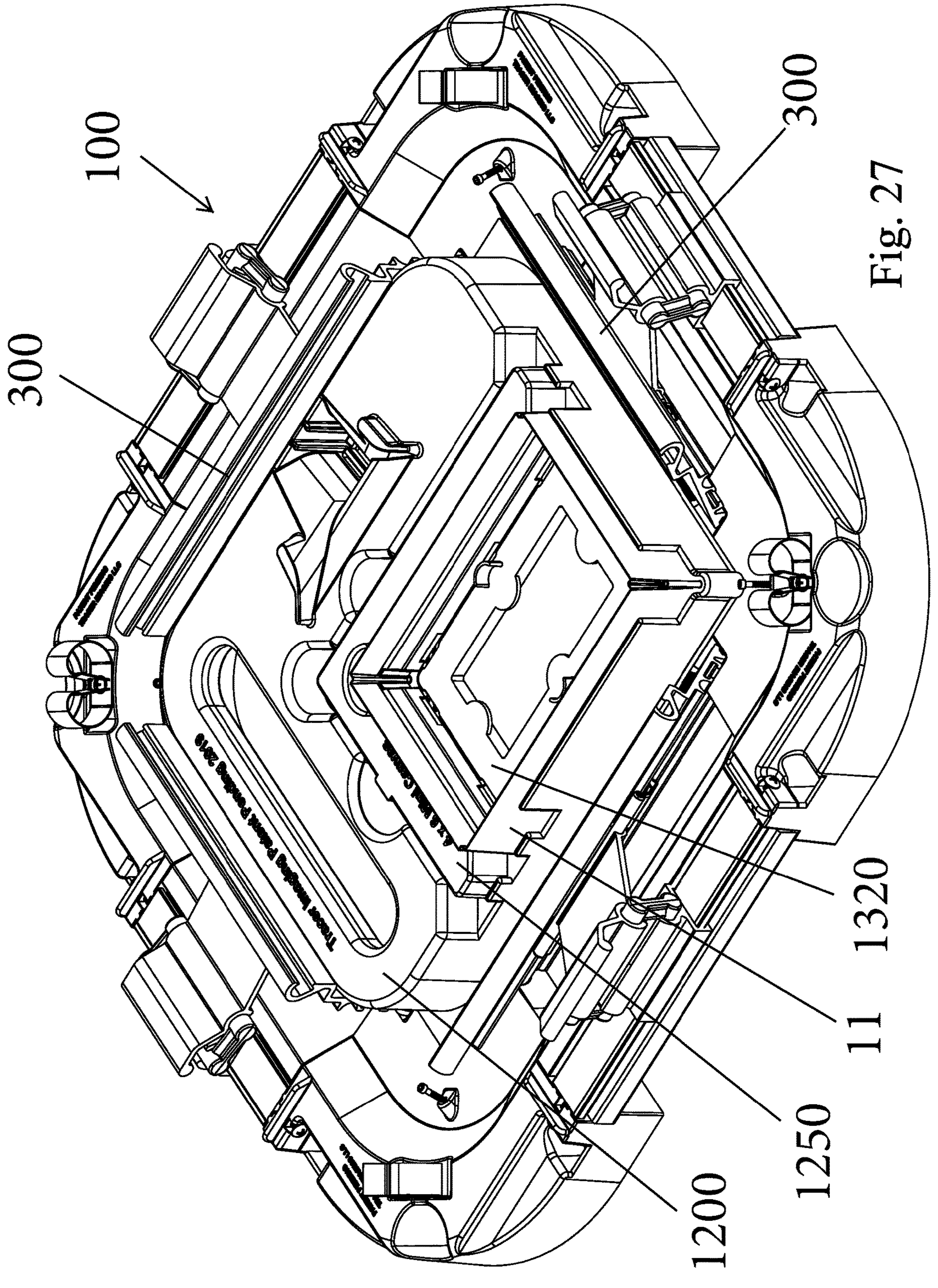
FIG. 27 shows another step of inserting the frame onto the canvas substrate and folding the edges upward with pleats also being shown in the corners of the canvas substrate.

Next, the frame 1320 is placed face down onto the canvas substrate 11 as shown in FIG. 27. In other words, the forward face of the frame 1320 is facing down. The frame 1320 is pressed down to until the edges of the canvas substrate 11 fold up. At this point, the folded up canvas edges are between the sides of the frame 1320 and the respective side walls of the adapter 1200.

Next as shown in FIG. 27, the adapter 1200 is clamped in place using the adapter fixture 100. More specifically, a plurality of the fence extrusions 300 are raised and they engage the adapter 1200 and clamp it in place. When the fence extrusions 300 are raised, the fence perpendicular extensions 360 (FIG. 2) can contact and press down on the top surface of the adapter 1200, thereby effectively holding the adapter 1200 in place. As shown, the fences 300 are raised and effectively clamp the adapter 1200 in place and extend above the tops of the fences 300. FIG. 27 illustrates that not all of the fence extrusions 300 need to be used to hold the adapter 1200 in place.

Next, the canvas substrate 11 is creased as by running a finger back and forth along the canvas substrate 11 to create creases on all four sides of the canvas substrate 11. The folded over sides of the canvas substrate 11 thus lies over the sides of the frame 1320.

Figure 29:
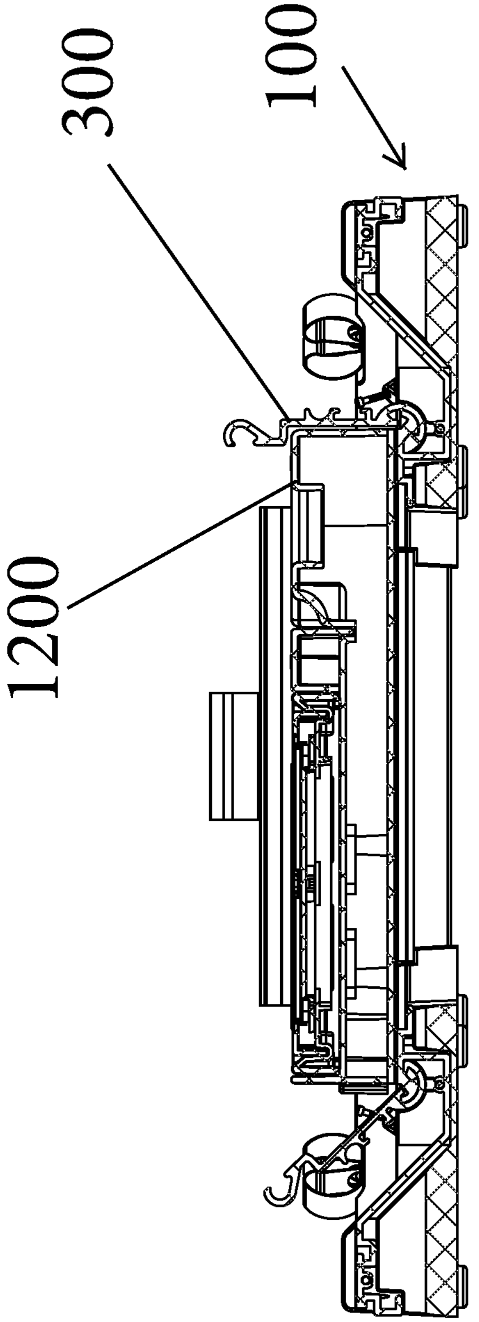

As shown in FIGS. 28 and 29, the rear panel 1330 is then placed (loosely inserted) into the frame 1320 with the forward face facing the frame 1320. In placing the rear panel 1330 into the frame 1320, the sides of the rear panel 1330 are disposed inside of the sides of the frame 1320, thereby capturing the canvas substrate 11 between the rear panel 1330 and the frame 1320.

Next, the toolhead linear pivot 1110 (round end of tool 1000 of FIG. 5) is inserted into the tool hook 340 of the fence 300. This can be accomplished by a sliding action in which the toolhead linear pivot 1110 is slid into the concave slot (tool hook 340), thereby locking the tool in place. Next the handle 1010 of the tool 1000 is pivoted down causing the toolhead bearing face 1120 (FIG. 5) to press upon the rear face of the rear panel 1330. As mentioned previously, this pressing action causes the rear panel 1330 to snap-fittingly connect to the frame 1320 and causes the canvas substrate 11 to be drawn taut (under tension—stretched over the frame 1320). The snap-fit results from the locking tabs 1360 associated with the rear panel 1330 engaging the locking edges 1362 of the frame 1320 due to the downwardly applied force of the tool 1000.

This process is repeated for each side of the rear panel 1330 resulting in all sides of the rear panel 1330 being snap-fittingly connected to the frame 1320 with the canvas substrate captured therebetween. The tool is thus inserted into each of the four fences 300 and then pivoted down to press the rear panel 1330 into place and into engagement with the frame 1320. The result of this step is that the rear panel 1330 is snap-fittingly mated with the frame 1320 and the canvas substrate 11 is stretched and held taut between the rear panel 1330 and the frame 1320. The canvas substrate 11 is thus pressed down into the troughs 1327 (FIG. 17) formed along each side of the frame 1320 and the locking tabs of the rear panel 1330 are engaged.

At this point in time, only the corners of the canvas substrate 11 are exposed and protrude and need to be finished. The corner pocket is spread apart and then each corner is pushed inward to form a pleat. Next, a pleat tool can be used to tuck in all four corners using the rounded end of the tool. The corner slots in both the frame 1320 and the rear panel 1330 accommodate the tool and allow the extra canvas material (in the corners) to be tucked into the corner slots. The pleat tool can be in the form of a thin elongated structure that is can fit within the corner slots in both the frame 1320 and rear panel 1330. One end of the pleat tool is inserted into the pleat to push the pleat into the slots.

Figure 32:
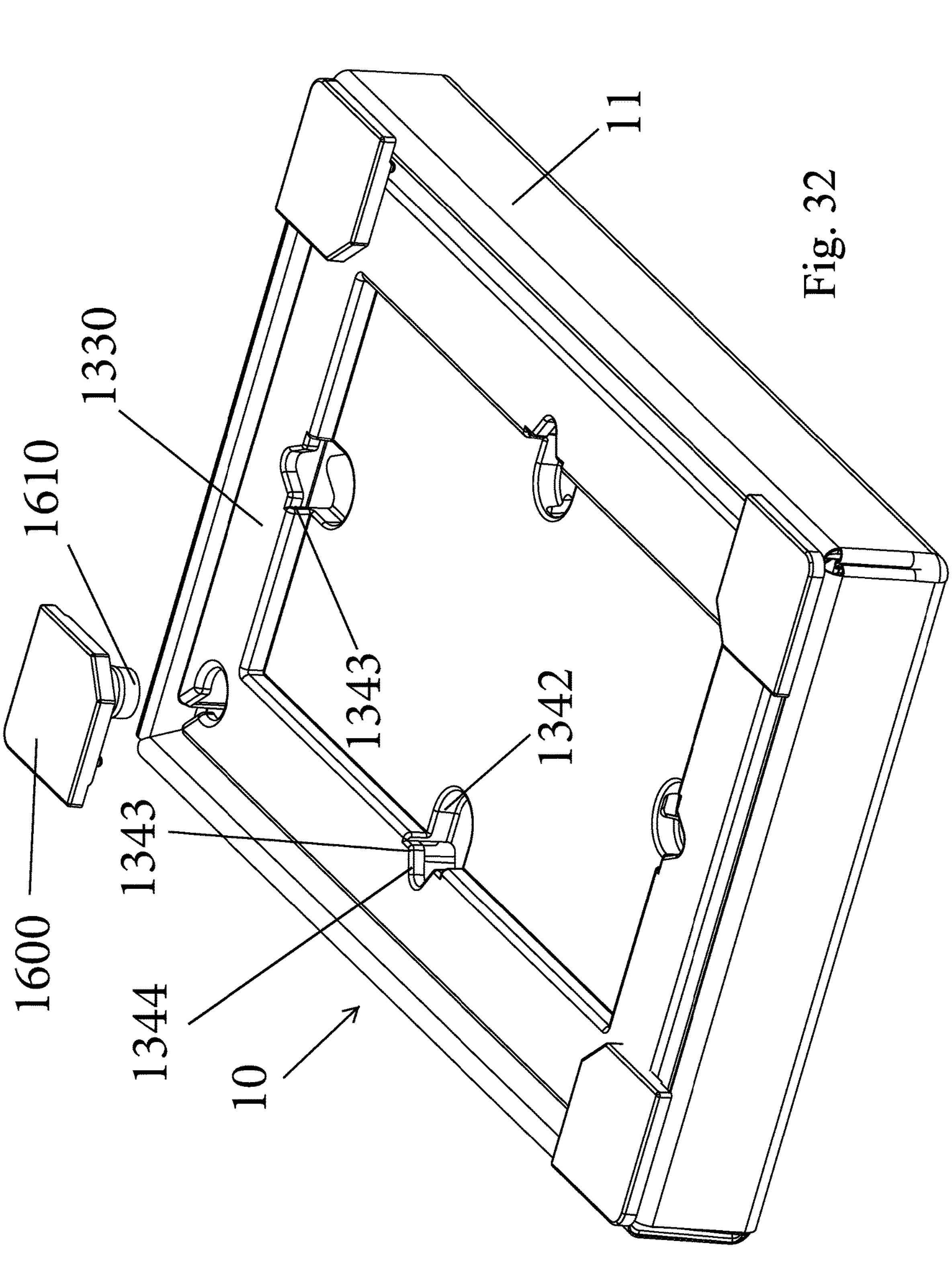
FIG. 32 is a rear and side perspective view of the assembled frame with corner caps.

Lastly, the corner caps 1600 are attached (e.g., snap-fit). As shown in FIG. 32, the rear face of the rear panel 1330 includes a circular shaped recessed portion that receives a round protrusion 1610 of the corner cap. The underside of the corner cap 1600 can also include a smaller protrusion or rib 1620 that is received within the corner slot 1337 of the rear panel 1330. The corner slot 1337 can have a narrow entrance portion that leads into a larger circular opening. Once the corner caps 1600 are installed, the display unit 10 is fully assembled and ready for use and/or packaging.

It will be appreciated that the adapter fixture 100 is one way to hold the adapter 1200 in place and allow for the assembly of the frame product but laying out the canvas substrate and then placing the frame base on the canvas substrate before then folding over the canvas substrate and snap-fitting the rear panel to the frame base such that the canvas substrate is captured therebetween. Other mechanism can equally be used to achieve the same results.

Figure 30:
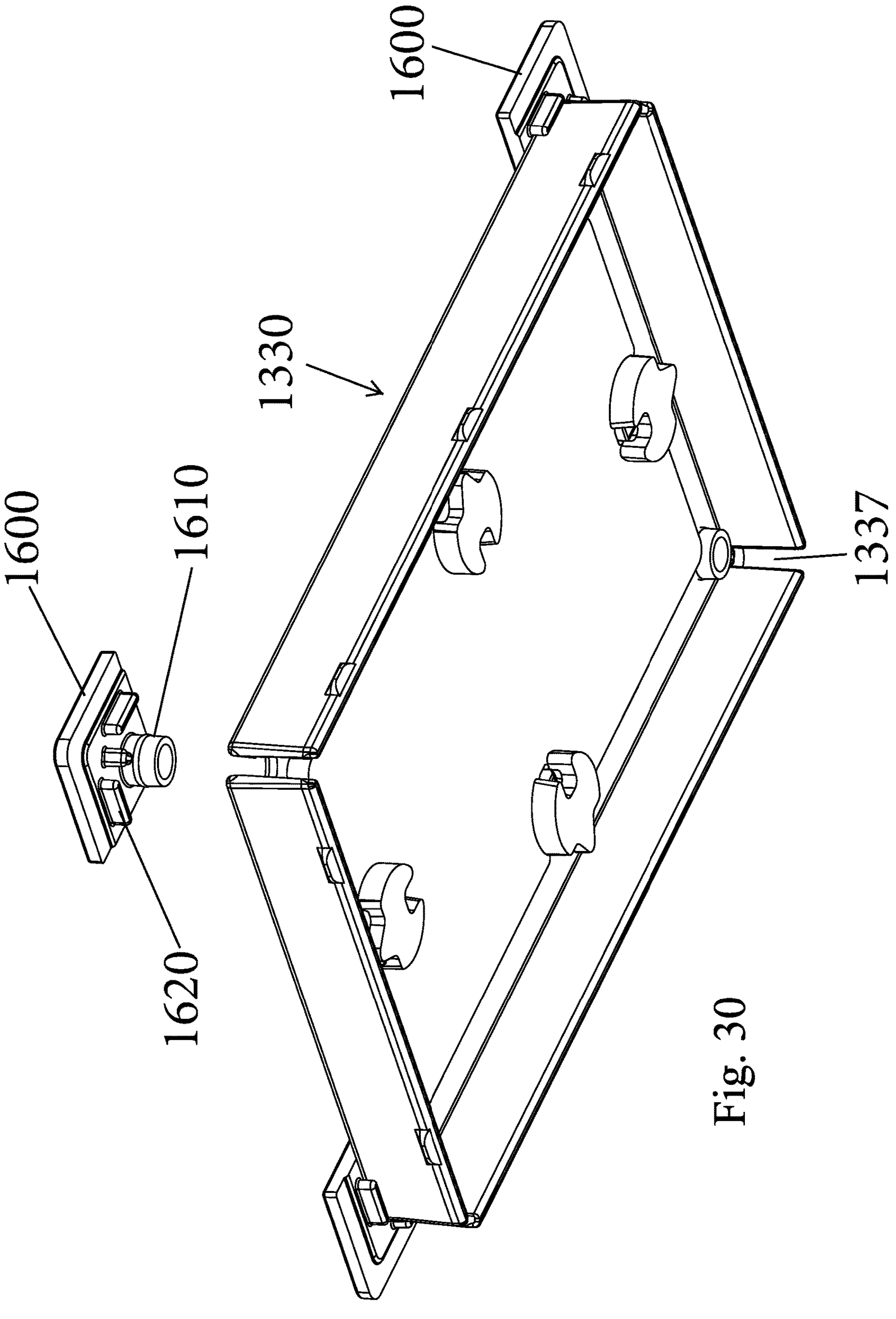
FIG. 30 is perspective view of the rear panel with corner caps.
Figure 31:
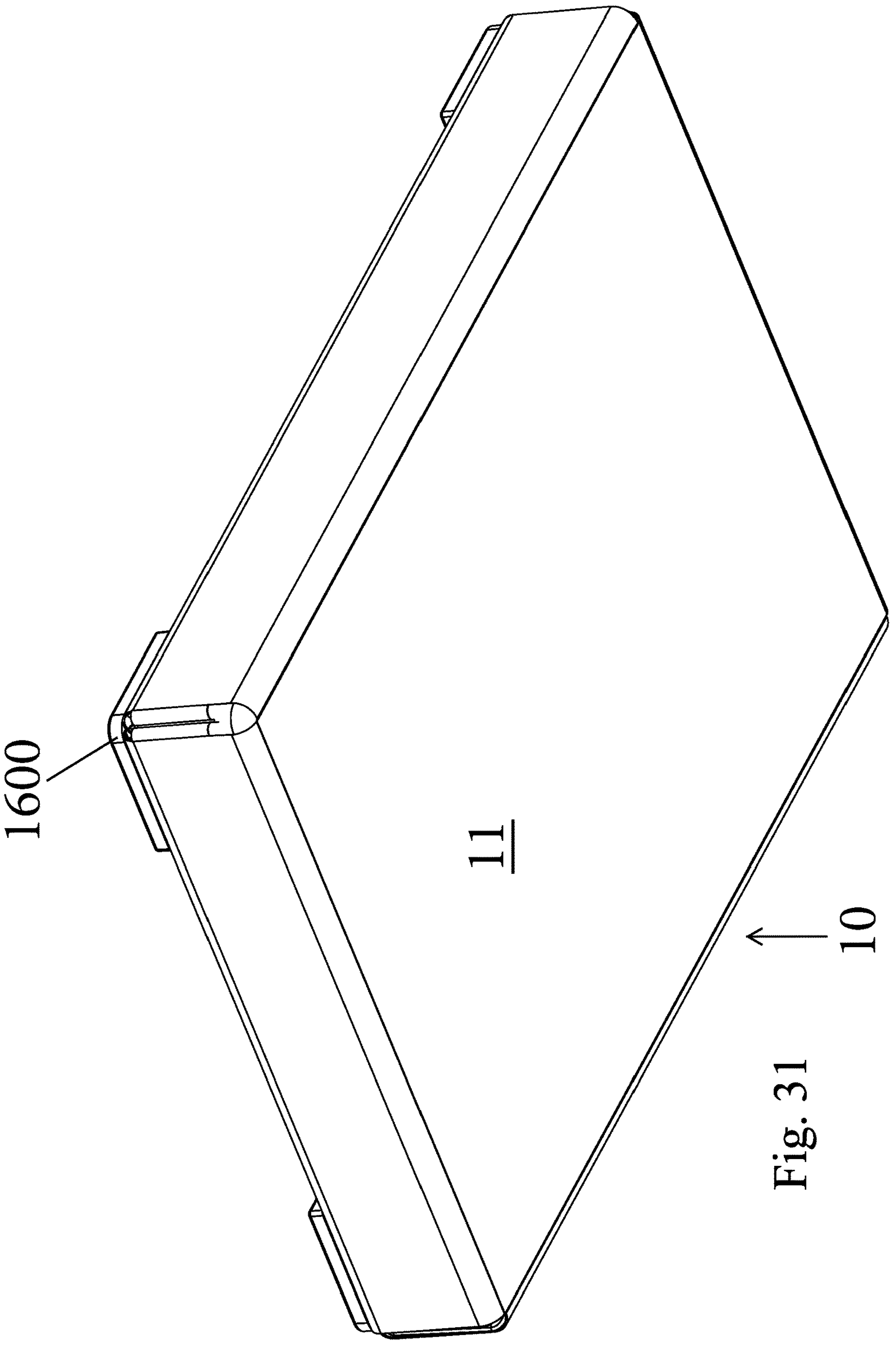
FIG. 31 is a front and side perspective view of an assembled frame.

FIGS. 30-32 illustrate an exemplary assembled framed product in which the rear panel 1330 snap-fits to the frame 1320, whereby the canvas substrate 11 is captured therebetween as described herein.

Alternative Framed Product

FIGS. 36-39 illustrate an alternative framed product 2000 that is similar to the ones previously described and in particular, is configured for use with the canvas substrate 11 for display thereof. The canvas substrate 11 is not shown in FIG. 39 for sake or clarity.

In one aspect, the framed product is in the form of a canvas print product in which a printed canvas is wrapped around the frame. The framed product 2000 includes a frame base 2010 and a real panel 2100. Similar to the framed product previously discussed, the framed product 2000 is configured to be assembled in a snap-fit manner which greatly simplifies the steps involved and reduces assembly time.

The frame base 2010 has a front face that faces and in is contact with the canvas substrate 11 in that the canvas substrate 11 extends and is held in a taut condition across the front face. The frame base 2010 has a plurality of outer side walls 2012 that define corners of the frame base 2010. Slots 2014 are formed in the corners.

Figure 38:
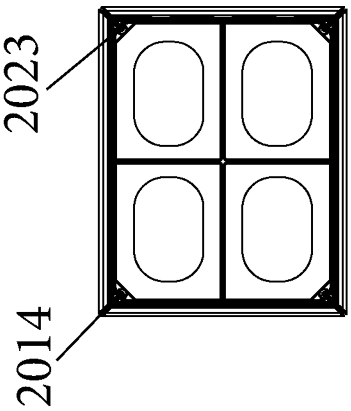
FIG. 38 is a rear view of a frame base.
Figure 39:
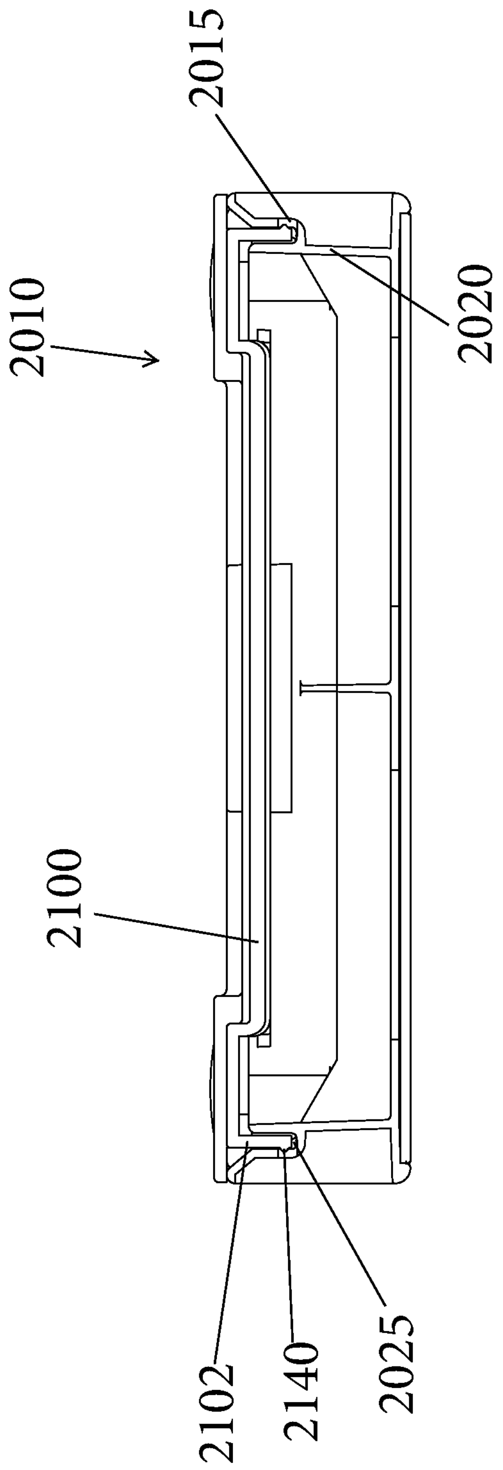
FIG. 39 is a cross-sectional view of the framed canvas product.

The frame base 2010 has an inner wall 2020 that is located inside of and spaced from the side walls 2012. As shown in FIG. 39, the inner wall 2020 can have a Y-shape and defines a canvas receiving channel 2025. In the illustrated embodiment, the channel 2025 extends internally around the square or rectangular shaped frame base 2010. As shown, the inner wall 2020 has folded corner portions 2022 that define slots 2023 (FIG. 38). The folded corner portion 2022 can be U-shaped.

Figure 36:
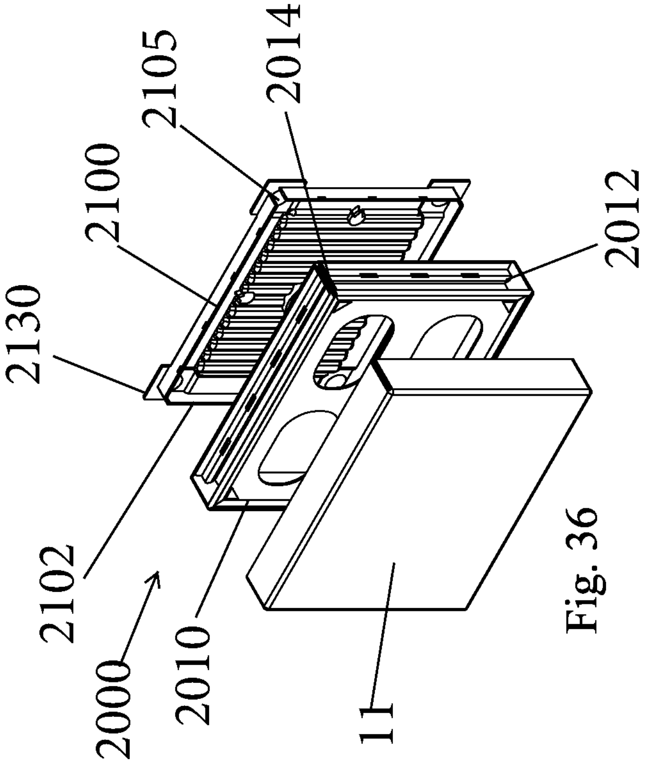
FIG. 36 is an exploded perspective view of a framed canvas product according to another embodiment.

Along an outer leg of the inner wall 2020 that is located along one side of the frame base 2010, there is one or more locking openings 2015. As illustrated in FIG. 36, two side walls 2012 located at ends of the frame base 2010 include three locking openings 2015, while the other two side walls 2012 include four locking openings 2015. The locking opening 2015 can have a rectangular shape. Each locking opening 2015 thus is in communication with the canvas receiving channel 2025 as shown in FIG. 39.

The rear panel 2100 includes a plurality of side walls 2102 that are connected to a rear wall 2104 that is located internally within the side walls 2102. Slots 2105 are formed in the corners of the rear panel 2100. When the rear panel 2100 is coupled to the frame base 2010, the slots 2105 are aligned with the slots 2014.

The rear panel 2100 is sized so that the rear panel 2100 can be inserted into the frame base 2010 and in particular, the side walls 2102 of the rear panel 2100 are received within the side walls 2012 of the frame base 2010 and more specifically, they are received within the channel 2025.

Within the corners of the rear panel 2100, there are four integral corner caps 2130. The corner cap 2130 serve a similar purpose as the corner caps 1600 except that the corner caps 2130 are integral to the rear panel 2100. The corner caps 2130 thus cover the pleated corners of the canvas substrate 11 which can have an unsightly appearance. In addition, external surfaces of two or more of the side walls 2102 include one or more locking tabs 2140. The locking tabs 2140 can be in the form of protrusions protruding outward from the side walls 2102. As illustrated, two side walls 2102 located at ends of the frame base 2010 include three locking openings 2015, while the other two side walls 2012 include four locking openings 2015. The locking opening 2015 can have a rectangular shape.

To couple the rear panel 2100 to the frame base 2010, a snap-fit is achieved between the two parts by inserting the locking tabs 2140 into the locking openings 2015 as the real panel 2100 is inserted into the frame base 2010.

As in the previous embodiment, the canvas substrate 11 is provided and the frame base 2010 is positioned over the rear face of the canvas substrate 11. The folded edges of the canvas substrate 11 is folded over the side walls 2012 of the frame base and are fed into the channel 2025. When the rear panel 2100 is inserted into the channel 2025, the side walls of the rear panel 2100 seat against the folded edges of the canvas substrate 11 and the locking tabs 2140 seat against and push the canvas substrate 11 forward at least partially into the locking openings 2015 which receive the locking tabs 2140 to effectuate a snap-fit between the rear panel 2100 and the frame base 2010.

In one aspect, the framed product 2000 is intended for assembly in an automated manner as by use of a robotic device. For example, one or more robotic devices can act on the parts and assemble the framed product 2000 and then optionally package the final assembled product. For example, a transporter (robotic arm) can move the various parts into position and then fold the canvas substrate 11 into the channel 2025 and then insert and lock the rear panel 2100 in place by inserting the rear panel 2100 into the frame base 2010 until a snap-fit is achieved. The robotic device is thus programmed to insert the rear panel 2100 into the frame base 2010 by inserting the rear panel 2100 a set distance which is effective to snap-fit the two parts together.

It will be understood and appreciated that while certain tools are described herein, the framed product can, in at least some implementations, be formed by a manual process performed by the user's hands. In other words, the rear panel 1330 can be mated with the frame member 1320 using a manual process. The steps are essentially the same as described herein except that instead of using the tool 1000 and after the canvas substrate 11 is tucked into the groove 1327, the rear panel 1330 is then pressed downward and this pressing action causes the rear panel 1330 to snap-fittingly connect to the frame 1320 and causes the canvas substrate 11 to be drawn taut (under tension—stretched over the frame 1320). The snap-fit results from the locking tabs 1360 associated with the rear panel 1330 engaging the locking edges 1362 of the frame 1320.

It is therefore possible to form the product by a manual process in which the frame 1320 is placed over the canvas substrate 11 and then the canvas substrate is folded over the frame 1320 so that edges are received within the groove 1327 and then the rear panel 1330 is placed over the frame 1320 and pressed downward to effectuate a snap-fit due to the mating between male and female parts associated with the frame 1320 and the rear panel 1330. The adapter fixture 100 can or cannot be used with the above manual process for forming the framed product.

It will also be understood that while the illustrated snap-fit comprises male elements (locking tabs) formed in the rear panel 1330 and female elements (openings) formed in the frame member 1320, the opposite can also be true in that the male elements can be formed in the frame member 1320 and the female elements can be formed in the rear panel.

It is to be understood that like numerals in the drawings represent like elements through the several figures, and that not all components and/or steps described and illustrated with reference to the figures are required for all embodiments or arrangements.

Thus, illustrative embodiments and arrangements of the present devices and methods provide a method for applying a hair fastener. The flowchart in the figures illustrates the operation of possible implementations of methods according to various embodiments and arrangements. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. A kit for constructing a framed canvas article comprising:

an adapter fixture for use with a first adapter, the adapter fixture including:

a fixture base that defines a platform for receiving the first adapter; and a plurality of linkages that are disposed about the platform and coupled to the base, each linkage being configured to move between a first position in which a fence bearing surface thereof is at an angle other than 90 degrees relative to the platform and a second position in which the fence bearing surface is set at an at least substantially 90 degree angle relative to the platform for locking and holding the first adapter in place; wherein the first adapter includes:

an adapter base having an open space defined by a floor and a plurality of side walls that extend upwardly from the floor, the adapter base having a first pin that is coupled to and extends upwardly from the floor, the first pin being located at an outer corner of the adapter base;

wherein the adapter base is disposed on the platform and is locked in place with the plurality of linkages when the plurality of linkages are in the second position.

2. The kit of claim 1, wherein the fixture base further includes a second pin that is spaced from the first pin.

3. The kit of claim 1, further including an L-shaped secondary adapter that is configured to be removably coupled to the adapter base, wherein the adapter base includes first locating feature that comprise one or more holes formed in the floor for receiving complementary protrusions formed along an underside of the L-shaped secondary adapter for removably coupling the L-shaped secondary adapter to the floor of the adapter base.

4. The kit of claim 3, wherein the L-shaped secondary adapter includes a recessed portion in a corner thereof with a pin being extending upwardly from a floor of the recessed portion of the L-shaped secondary adapter.

5. The kit of claim 3, wherein the adapter base is configured to receive a 5×7 inch framed canvas article and the L-shaped secondary adapter is configured to receive a 4×6 inch frame canvas article.

6. A frame comprising:

a rear panel having a plurality of hanging openings formed and being open along a rear face of the rear panel, each hanging opening comprising a first region at a first end of the hanging opening and a second region at an opposite second end of the hanging opening, the first region being separated from the second region by an interface, the first region having a shape different than a shape of the second region;

wherein the rear face of the rear panel has a stepped construction with an outer perimeter border being raised relative to a center section of the rear panel, the first region being formed in the outer perimeter border and the second region being formed in the center section and the interface comprising a shoulder between the outer perimeter border and the center section.

7. The frame of claim 6, wherein the first region has a U-shape.

8. The frame of claim 6, wherein the first region has a U-shape and the second region has a parabolic shape.

9. The frame of claim 8, wherein the interface extends from legs of the U-shaped first region to an entrance into the parabolic shaped second region.

10. The frame of claim 8, wherein the interface comprises a planar interface located at an open end of the U-shaped first region and laterally outside of an open end of the parabolic second region.

11. The frame of claim 6, wherein the first region is closer to a center of the rear panel and the second region is closer to an outer perimeter edge of the rear panel.

* * * * *